United States Patent
Pecoraro et al.

(12) 
(10) Patent No.: US 6,372,685 B1
(45) Date of Patent: Apr. 16, 2002

(54) POWDERS OF SILICA-OXIDE AND MIXED SILICA-OXIDE AND METHOD OF PREPARING SAME

(75) Inventors: Theresa A. Pecoraro, Danville; Ignatius Y. Chan, Novato; Darryl K. Whaley, Vallejo, all of CA (US); Pamela R. Auburn, Houston, TX (US)

(73) Assignee: Chevron Phillips Chemical Company, LP, Houston, TX (US)

( * ) Notice: Subject to any disclaimer, the term of this patent is extended or adjusted under 35 U.S.C. 154(b) by 0 days.

(21) Appl. No.: 09/557,437

(22) Filed: Apr. 25, 2000

Related U.S. Application Data

(62) Division of application No. 09/060,340, filed on Apr. 14, 1998, now Pat. No. 6,107,236.

(51) Int. Cl.$^7$ ................................................ B01J 21/08
(52) U.S. Cl. ....................... 502/232; 502/233; 502/234; 502/238; 502/256; 502/87; 526/348; 526/89
(58) Field of Search ................................. 502/232, 233, 502/234, 256, 238, 87; 526/348, 89

(56) References Cited

U.S. PATENT DOCUMENTS 4,131,542 A * 12/1978 Bergna et al. .................. 502/9
4,975,405 A * 12/1990 Okamura et al. ........... 502/233

* cited by examiner

*Primary Examiner*—David W. Wu
*Assistant Examiner*—Ling-Siu Choi
(74) *Attorney, Agent, or Firm*—Hsiang-ning "Sean" Sun

(57) ABSTRACT

Silica powders and mixed silica-oxide powders and methods of preparing such powders for use as catalyst supports for polymerization processes.

12 Claims, 10 Drawing Sheets

POWDERS OF SILICA-OXIDE AND MIXED SILICA-OXIDE AND METHOD OF PREPARING SAME

This application is a Divisional of Ser. No. 09/060,340, filed on Apr. 14, 1998, now U.S. Pat. No. 6,107,236.

FIELD OF THE INVENTION

This invention relates to silica powders and mixed silica-oxide powders and methods of preparing such powders for use as catalyst supports for polymerization processes.

BACKGROUND OF THE INVENTION

The use of amorphous gels and precipitates as support material for polymerization catalysts is known. For example, aluminophosphate gels and precipitates have often been used for such support materials. In some cases, the support was improved by incorporating silica into the aluminum phosphate support.

While aluminophosphates have long been known, along with their methods of preparation, such aluminophosphates have not as yet achieved commercial success. Part of this is believed to be that the prior art aluminophosphates lacked a combination of physical properties which have been found to characterize superior polymerization catalysts. It is the combination of a high macropore volume of at least 0.1 cc's per gram plus a fragmentation potential (to be defined below) of preferably 30 to 60 plus a preferred mesopore volume of 0.3 to 0.8 cc's per gram which particularly characterize the superior polymerization catalysts. In two prior inventions of Applicants (Pecoraro and Chan, U.S. patent application Ser. No. 08/742,794 U.S. Pat. No. 6,022,313; Auburn and Pecoraro, U.S. patent application Ser. No. 08/741,595 U.S. Pat. No. 5,869,587), which are incorporated herein by reference, a new aluminophosphate with both high macropore volume and a fragmentation potential about 30 was developed which was also both physically and thermally stable. It is believed that the presence of sheets of aluminophosphate in the microstructure results in the packing of the microstructures in such a way that a high macropore volume and a high fragmentation potential are achieved along with physical and thermal stability.

In another related invention by Applicants (U.S. application Ser. No. 08/961,825 U.S. Pat. No. 6,111,037, Auburn, Pecoraro and Chan), which is a continuation-in-part of Ser. Nos. 08/741,595 and 08/742,794 discussed above, and which is also incorporated by reference herein, a silica-modified, amorphous aluminophosphate composition which like the previous inventions exhibits a microstructure of sheets and exhibits spheres of silica-modified aluminophosphate as well.

The use of silica alone or the combination of silica with other oxides such as alumina or titania or vanadia to form such amorphous compositions for use as polymerization catalyst support material is also known. Previously, the microstructure of such supports primarily contained small particles. As a result of this small particle structure, it was difficult to tailor the materials over a wide range of pore sizes, distributions and volumes, and of acceptable fragmentation characteristics.

It would be desirable to find silica support materials which could be used over a wide range of pore sizes, distributions and volumes and of acceptable fragmentation characteristics.

The present invention has achieved such materials. The present invention has achieved high surface area, amorphous silicas which surprisingly form a continuous network matrix, rather than the typical small particles found in conventional amorphous silicas. Furthermore, the pore size and the distribution and volume of the pore size can be tailored over a wide range.

Surprisingly, also, the present invention achieves an amorphous $SiO_2$ base composition with a non-particulate, dense, network matrix and encapsulated less dense, non particulate regions with true macropores. In one embodiment, the present invention also comprises a sheet-like microstructure.

SUMMARY OF THE INVENTION

One object of the present invention is to provide an amorphous $SiO_2$ or mixed oxide silica base composition comprising:

(a) a non-particulate, dense, continuous network matrix; and (b) encapsulated, less dense, non particulate regions with true macropores.

Another object of the present invention is to provide such an amorphous $SiO_2$ or mixed oxide silica base composition in which the gel matrix further comprises a sheetlike microstructure.

Still another object of-the present invention is to provide such an amorphous $SiO_2$ or mixed oxide silica base composition in which the composition has surface areas in a range of from 150 to 600 $m^2/gm$.

Yet another object of the present invention is to provide such an amorphous $SiO_2$ or mixed oxide silica base composition in which the composition has a mean mesopore diameter in a range of from 60 to about 250 Å.

An additional object of the present invention is to provide such an amorphous $SiO_2$ or mixed oxide silica base composition in which the composition has a measured pore volume in a range of from about 0.5 to 1.5 cc/gm.

Still another object of the present invention is to provide such an amorphous $SiO_2$ or mixed oxide silica base composition in which the composition has a macropore volume of at most 0.5 cc/gm.

Yet another object of the present invention is to provide an amorphous mixed oxide silica base composition selected from the group consisting of silica alumina, silica titania, silica vanadia and silica zirconia.

An additional object of the present invention is to provide powders produced from such an amorphous $SiO_2$ or mixed oxide silica base composition.

A further object of the present invention is to provide such powders which are spray dried.

Yet a further object of the present invention is to provide such powders which are vacuum dried.

Still a further object of the present invention is to provide such spray dried powders having fragmentation potentials in a range of from about 20 to about 30.

Another object of the present invention is to provide a catalyst comprising such a $SiO_2$ base composition, the composition being impregnated with a catalytic amount of at least one transition metal-containing compound.

Yet another object of the present invention is to provide such a catalyst in which the at least one transition metal-containing compound is a chromium compound.

Still another object of the present invention is to provide such a catalyst in which the at least one transition metal-containing compound is present in an amount of 0.1 weight percent or greater based on the total catalyst weight.

An additional object of the present invention is to provide such a catalyst in which the at least one transition metal-containing compound is present in an amount in the range of from about 0.1 weight percent to about 10 weight percent.

Yet an additional object of the present invention is to provide a polymerization process comprising contacting such a catalyst with at least one alpha-olefin under polymerization conditions.

Still an additional object of the present invention is to provide a method for preparing a silica gel composition which is a precursor material for a silica powder material with a microstructure comprising a non-particulate, dense, continuous network matrix and encapsulated, less dense, non particulate regions with true macropores, the method comprising:

(a) forming a first aqueous solution comprising silica ions;

(b) forming a second aqueous solution capable of neutralizing said first aqueous solution; and (c) contacting said first and second aqueous solutions in a mixer-reactor under mixing conditions to form the silica gel composition.

An additional object of the present invention is to provide an olefin polymerization catalyst prepared from a silica gel composition obtained by such a method.

Yet another object of the present invention is to provide such a method in which the first aqueous solution is an acidic solution comprising sodium silicate and acid and in which the second aqueous solution has a pH above 8.

Still an object of the present invention is to provide such a method in which the second aqueous solution is an ammonia based material selected from the group consisting of ammonium hydroxide; ammonium carbonate; ammonium bicarbonate and urea.

An additional object of the present invention is to provide such a method in which the first aqueous solution is a basic solution of sodium silicate and in which the second aqueous solution has a pH below 6.

Yet an additional object of the present invention is to provide such a method in which the second aqueous solution is sulfuric acid.

Still an additional object of the present invention is to provide such a method, in which the apparent average shear rate in the mixer-reactor is greater than about $0.5 \times 10^4$ sec$^{-1}$.

Another object of the present invention is to provide such a method in which the neutralization step is conducted in such a manner that the pH of the combined first aqueous solution and the neutralizing medium is controlled in the range of about 3.5 to about 11.

Yet another object of the present invention is to provide such a method in which the catalyst is activated by being heated to a temperature in the range of 300° C. to 900° C. for from 2 to 16 hours.

Still another object of the present invention is to provide such a method further comprising the steps of:

(a) preparing an aqueous slurry of amorphous silica gel by continuously feeding an acidic solution comprising sodium silicate and acid to an emulsifier mixer while simultaneously and continuously feeding to said mixer an alkaline solution;

(b) operating said mixer with sufficient shear so that the precipitated silicate has sheets of silica in its microstructure;

(c) recovering said silica from said aqueous slurry using a vibrating filtration membrane to a solids content from 8 to 20 wt. %, after washing;

(d) drying and calcining the silica from (c);

(e) dispensing a chromium compound substantially uniformly onto said silica to form a catalyst having from 0.01 to 4 wt. % chromium;

(f) drying said catalyst; and (g) activating said dry catalyst from (f) by heating to a temperature from 300° C. to 900° C. for from 2 to 16 hours.

Yet another object of the present invention is to provide an olefin polymerization catalyst prepared by such a method.

Another object of the invention is to provide such a method further comprising aging the silica gel composition in deionized water for up to one hour.

Yet another object of the present invention is to provide a method of preparing the silica powder composition from such a silica gel composition comprising the steps of:

(a) washing the silica gel with solutions of ammonium acetate, bicarbonate or nitrate;

(b) washing the silica gel composition in deionized water to further replace salts-contaminated water in the composition with fresh water; and (c) drying the washed composition to remove substantially all water.

Still another object of the present invention is to provide such a method further comprising calcining the dried composition in a fixed fluid bed type calciner for up to 8 hours at a maximum temperature of 450° C.

Another object of the present invention is to provide a polymerization process comprising contacting at least one mono-1-olefin having from 2 to 8 carbon atoms per molecule under polymerization reaction conditions in a polymerization reaction zone with a catalyst comprising an active catalytic component on a silica support comprising (a) a non-particulate, dense, gel matrix; and (b) encapsulated regions with true macropores.

Still another object of the present invention is to provide such a polymerization process in which the catalytic component comprises a chromium component on the silica support.

Yet another object of the present invention is to provide such a polymerization process in which the at least one mono-1-olefin is selected from ethylene; propylene; butene-1; hexene-1 and octene-1.

An additional object of the present invention is to provide such a polymerization process in which the at least one mono-1-olefin comprises ethylene and from 0.5 to 2 mole percent of one additional mono-1-olefin selected from propylene; butene-1, hexene-1 and octene-1.

A further object of the present invention is to provide a method for preparing silica alumina powder material with a microstructure comprising a non-particulate, dense, continuous network matrix and encapsulated regions with true macropores and sheets, the method comprising:

(a) preparing an acid aqueous solution comprising aluminum and silicon ions;

(b) preparing a basic aqueous solution comprising ammonium hydroxide;

(c) mixing the acidic aqueous solution and the basic aqueous solution in a mixer to obtain a gel slurry with a microstructure comprising a non-particulate, dense, continuous network matrix, encapsulated regions with true macropores and sheets;

(d) maintaining the gel at approximately pH 8.0 for up to one hour before washing the gel slurry;

(e) washing the gel slurry first with an aqueous ammonium acetate or ammonium bicarbonate solution, then with water to obtain a gel conductivity below 1,000 mmhos;

(f) acidifying and concentrating the gel slurry by adding acid to the gel slurry to achieve a pH below 6.0 while gradually removing water from the gel slurry; and (g) drying and calcining the gel slurry to form the silica-alumina powder material.

DETAILED DESCRIPTION OF THE INVENTION

Figure 1:
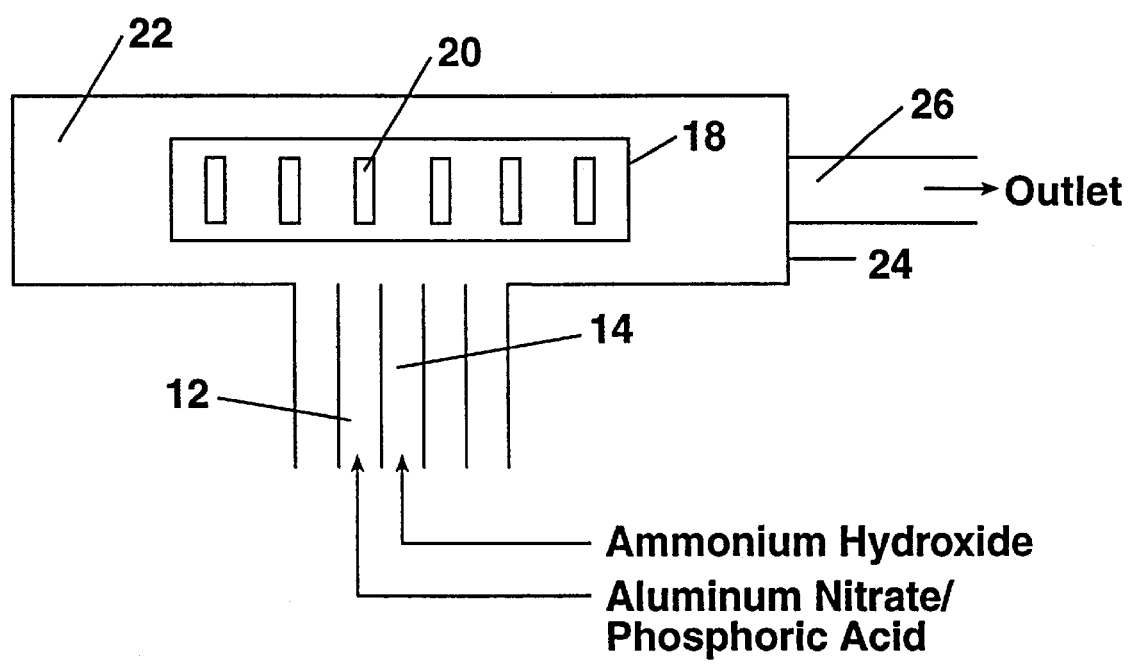
FIG. 1 is a side view of a mixer-reactor.

The present invention relates to high surface area, amorphous silicas which form a continuous network matrix, rather than the typical small particles found in conventional amorphous silicas. Furthermore, the pore size and the distribution and volume of the pore size can be tailored over a wide range so that the silicas have unique microstructures and varied physical properties, such as surface area, pore volume, mean mesopore size, mesopore size distribution, macropore volume and acceptable fragmentation potentials and methods of making such silicas.

An especially significant aspect of the present invention is the achievement of "true" macropores in the amorphous silica material. These macropores are "true" in the sense that their existence is verified and their structure observed and measured by TEM techniques, differing from "apparent" macropores which are observed and measured by mercury porosimetry.

Mercury porosimetry is the common technique for measuring the amount of macropores in a catalyst sample. The technique involves subjecting the sample which was immersed in Hg to increasing pressure. The pressure change starts from atmospheric (14 psi) to about 60,000 psi. The volume change in the Hg level is monitored and plotted against the pressure change. The change in Hg level was assumed to be the result of the Hg penetrated into the pore spaces of the catalyst. The plot of the Hg volume change against the applied pressure can then be presented as the pore size distribution of the catalyst.

However, when the skeletal framework structure of the catalyst departs significantly from being infinitely rigid, some of the volume change in Hg level recorded by the instrument comes about because the porous catalyst particle was compressed or "squeezed" and not Hg penetrated into the pores. Hence, the instrument could report the existence of macropores while in reality there were none present, especially in the case of silica based catalysts. A detailed discussion of this phenomenon has been published by Vittoratos and Auburn. (E. S. Vittoratos and P. R. Auburn, "Mercury Porosimetry Compacts $SiO_2$ Polymerization Catalysts", *J. of Catalysis*, 152, 415–418 (1995)). TEM is the only technique to verify the existence of true macropores. However, the usefulness of TEM to quantify the amount of macropores is at best quite limited, because of the difficulty of visually identifying and counting each macropore in a TEM micrograph.

It is thus clear that the mercury porosimetry instrument practically always overestimates the amount of macropores. The true value matches the apparent (reported) value only for the limiting case of an infinitely rigid sample. The apparent value can be positive even when the true value (verified by TEM) is zero. EP-50 is an example of a commercially available silica material which has been tested with the mercury porosimetry method and apparent macropores were found but were not verified by the TEM method.

The invention also relates to mixed silica-oxides in which the oxide is alumina, titania, zirconia, vanadia, etc., and combinations thereof, with unique microstructures, unique catalytic performance and varied physical properties and methods of making such materials. Such mixed silica-oxides also have continuous, tightly packed, gel network which routinely contain the unique sheet structures. Furthermore, the mixed oxides are homogeneous (i.e., no individual separate oxide phases are observed), and the pore size, pore size distribution, and volume (meso) of these materials can be tailored also.

These silicas and mixed-oxide silicas are prepared via gelation of sodium silicate alone or in combination with the precursors of the other oxides. The gelation can proceed from either the acid or the base side, but it must be done with a high rate of mixing with shear forces. The gel slurry can be washed at different pH's via a batch or via a V*Sep process to remove contaminant salts and to dewater the gel slurry. The washed gels may be aged at various pH's, temperatures and times to alter the meso and macropore characteristics. Spray drying is the preferred method of forming and drying.

Figure 2:
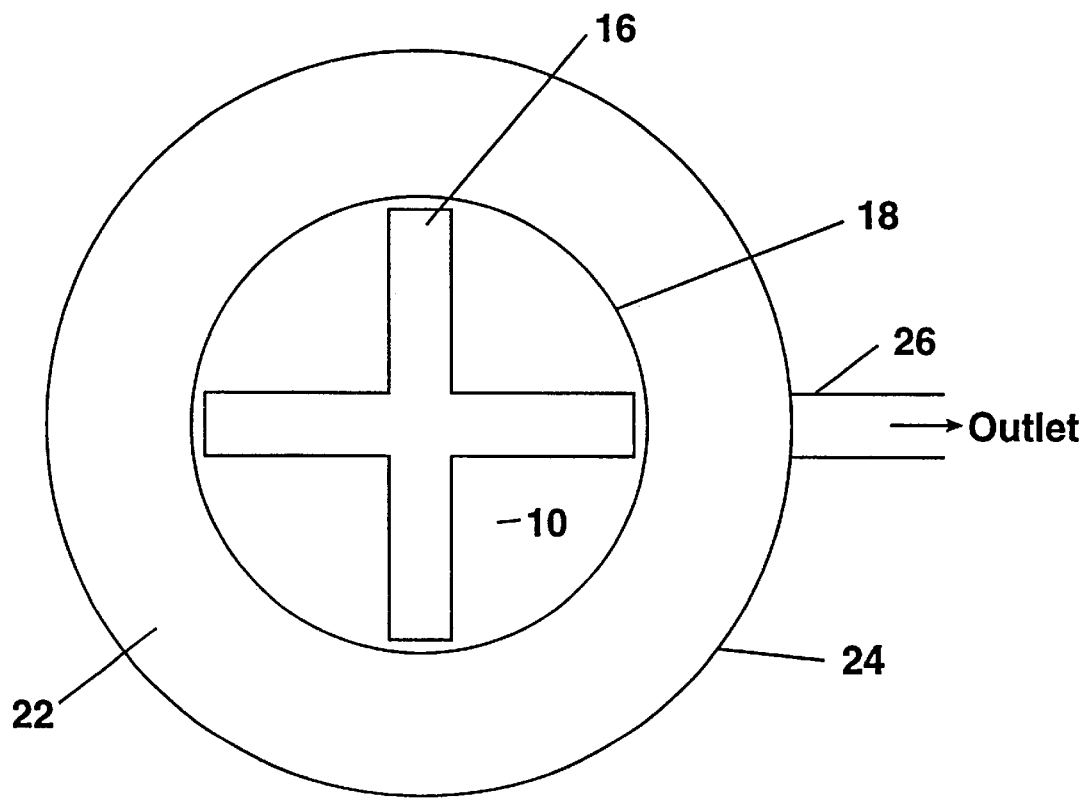
FIG. 2 is a top view of a mixer reactor.

There are, of course, various types of mixing techniques and apparatus which generate varying levels of shear delivery mixing. See for example, "Scaleup and Design of Industrial Mixing Processes" by Gary B. Tatterson, McGraw-Hill, Inc. (1994) and especially FIG. 2.9 which illustrates the shear level of various types of mixers and impellers. Referring to FIG. 2.9 of Tatterson, which is incorporated herein by reference, the colloid mills, saw blade type impellers; homogenizers and stator rotor mixers provide the highest level of shear while the hydrofoil and propeller provide the lowest shear. The newer jet stream mixers can also be employed with sufficient shear as taught herein.

Shear in this specification means shear rate which is a change in velocity ($\Delta V$) divided by a change in distance ($\Delta d$). For example, in a rotor shear mixer, the fluids to be mixed usually are pumped into the rotor stator chamber through concentric tubes. The rotor stator chamber consists of a rotor revolving at some desired rate and a "stator" or surrounding wall close to the tips of the revolving rotor. The wall is provided with openings to permit the mixed fluids to be removed or withdrawn quickly and continuously from the rotor-stator chamber.

Using the rotor stator mixer as an example, the velocity of the fluid is highest at the tip of the rotor impeller and is zero at the wall. Thus, the ΔV is taken as the velocity at the tip which can be calculated by multiplying the revolutions of the rotor per second times the radius of the rotor, i.e.:

$$\Delta V = ND/2$$

where N=revolution of the rotor per second; D=diameter of rotor.

The "change in distance", Δd, is equivalent to the distance over which one measures the change in velocity over the change in distance and is calculated by the equation:

$$\text{Apparent Average Shear Rate} = \frac{\Pi ND}{W}$$

$$\Pi = pi = 3.1416$$

where
- N is the revolutions of the impeller per second;
- W is the distance between the tip of the impeller and the wall of the mixer; and
- D is the diameter of the rotor (in the case of rotor-stator mixer) or can be the thickness of the impeller blade for other mixers.

It will be obvious to those with ordinary skill in the art that shear rates can be increased by increasing ΔV or decreasing Δd.

Gelling Silica Salts

It is possible to form gel from silica salts by either adding an acid such as sulfuric acid to sodium silicate or adding a base such as ammonium hydroxide (sodium silicate plus acid). It is also possible to form gels from an acidic mixture of oxide precursors and a sodium silicate plus acid by adding a base such as ammonium hydroxide. In a preferred embodiment of making silica, adding acid to sodium silicate solutions was used. The acid and base solutions were mixed with high-shear, continuous gelation (CHSG) using a two-stream feed system pumped directly into a Ross mixer (reactor). For gelling to occur in the high shear reactor, it was necessary to determine the acceptable concentrations of the reacting silica salt, the pH, the temperature, the mixing rate, and the stator configuration. Removing the residual salts is important.

Achieving the right degree of washing with a batch (i.e., repulping and filtering) or a continuous (i.e., V*Sep difiltration) process has a significant effect on both the performance of the finished catalyst and the outcome of any subsequent aging steps. The amount of residual salt influences the type and degree of aggregation of the primary particles subsequently affecting the pore size and pore size distribution of the dried powder. In addition, an aging step definitely can be used to vary physical properties of resultant $SiO_2$ bases.

Preparation of $SiO_2$ Powders
"General Procedure"
Step 1—Preparation of Solution of Silicate Anions
(A) Add the desired amount of sodium silicate to DI water with mixing.
(B) Dilute the sulfuric acid with DI water by weight.

Step 2—Relation

The silicate solution formed in Step 1 and sulfuric acid solution were simultaneously pumped into the mixing chamber of a Ross-In-Line Laboratory Emulsifier (obtained from Charles Ross and Son Company, Hauppauge, N.Y., Model ME 300L) shown diagrammatically in FIG. 1 (sideview) and FIG. 2 (topview). Referring to FIGS. 1 and 2, the basic solution silicate anions prepared in Step 1A is pumped into the mixing chamber 10 through the outer ¼" inside diameter tube 12 and the sulfuric acid prepared in Step 1B is pumped into mixing chamber 10 through the inner, ⅛" inside diameter, tube 14. The mixing chamber 10 is fitted with a rotor impeller 16 having four arms and a stationary cylindrical wall 18 surrounding the rotor impeller 16 and in relatively close proximity to the tips of the impeller arms. The stationary wall 18 is provided with slots 20 through which the fluids and produced hydrogel pass into the annular portions 22 of mixing chamber 10 and then out of the mixing chamber 10 through outer housing 24 and line 26. The acid and base solutions react in the mixing chamber 10 while the rotor impeller 16 operates at the desired revolutions per minute to provide the apparent average shear rate as taught above. The distance between the tip of one arm of impeller 16 and wall 18 is the "W" for use in the shear rate equation set forth earlier in this specification. The specific "W" for the mixer-reactor used in the working examples below was 0.01 inches and the diameter "D" of the rotor was 1.355 inches. The rate of addition of the acid and base solutions into the mixing chamber 10 is set to achieve desired pH at the outlet 24.

Step 3—Washing

The hydrogel was washed either by a batch process or by diafiltration. In one case, Examples 14 and 15, the same hydrogel was washed both ways.

Batch Washing

The hydrogel was blended with the desired wash solution in a Waring blender, mixed for about 15 minutes with a marine impellar mixer, and then filtered. This was done until the conductivity of the filtrate equaled the conductivity of the wash solution. Then the hydrogel was blended with DI water and filtered to yield a gel cake.

Diafiltration

The hydrogel in the holding tank was diluted with hot (50° C.) DI water to about 4 to 10 weight percent solids as measured by an LOM instrument (CEM AVC 80).

This dilute hydrogel was washed on a vibrating filtration membrane machine (New Logic International V*SEP machine (Series P) where V*SEP stands for Vibratory Shear Enhanced Processing). This washing process known as difiltration involves dewatering the hydrogel and adding fresh DI water at the same rate at which the filtrate or permeate containing the contaminated salts is removed. The washing is continued until the desired conductivity of the permeate as measured by a conductivity meter (Yokogama Model SC400 conductivity converter) is achieved.

Once the desired conductivity was achieved, the hydrogel solution was concentrated to the maximum "pumpable" weight percent solids (by LOM).

This was done by dewatering the hydrogel solution by not adding fresh DI water.

Step 4—Aging

The washed hydrogel was filtered to yield a filter cake. The filter cake was diluted with DI water to allow for mixing with a marine impellar mixer. The pH of the slurry was adjusted with either acetic acid to a pH equal to about 5.6 or with ammonium hydroxide to a pH equal to about 9.6. The pH adjusted slurry was heated to 50° C. over about 15 minutes and then held at 50° C. for about 15 minutes. The hot aged slurry was then pumped to the feed system of the spray dryer.

Step 5—Drying

Vacuum Drying

The gel cake was dried in a vacuum oven at 80° C. overnight.

Spray Drying

The hydrogel from Step 3 or 4 was pumped to the feed system of a Stork Bowen BE 1235 spray dryer and dried. The spray dryer conditions were varied, by means well known to those having ordinary skill in the art, to achieve a desired particle size, LOM moisture weight percent and other desired characteristics.

Step 6—Calcination

The spray dried from Step 5 was calcined in a muffle furnace for one hour at 400° C.

The vacuum dried hydrogel was calcined in a muffle furnace for one hour at 400° C.

In some Examples below, the uncalcined (as vacuum dried or spray dried) silica was impregnated with a chromium salt to deposit about 1 weight percent chromium on the support on an LOI basis, done at 1000° F. for one hour. Chromium impregnation is done using a Buchi rotovap. A maximum of 50 g of powder is added to a 500 ml rotovap flask. About 75 to 100 g of the solvent methanol or DI water is added to the powder (solvent to powder ratio is always approximately 2 to 1 by weight). Swirl the flask to achieve uniform wetting of the powder. Weigh the chromium (III) acetate hydroxide and dissolve in the solvent (approximately 15–30 ml). Add the chromium solution to the powder slurry and swirl to evenly coat the powder. Attach flask to the Buchi and spin the flask for approximately 5 minutes without vacuum to mix the slurry. Using a vacuum regulator and vacuum pump, set the vacuum to approximately 200 to 400 mm Hg, and lower the flask into an 80° C. water bath when water is the solvent or a 40° C. water bath when methanol was the solvent. Maintain these conditions until approximately 80% of the solvent was evaporated. Slowly increase the vacuum to approximately 600 mm Hg as necessary to remove the last of the solvent without "bumping" any of the slurry/powder over. When the powder appears completely dry, increase the vacuum to maximum for approximately 5 minutes. After the last vacuum adjustment is complete, release the vacuum and shut off the Buchi.

Such silicas and mixed silica-oxides have a wide variety of uses, especially as supports for ethylene polymerization. Also, because of the catalytic and physical properties, the mixed silica-oxides can be tailored for use as FCC catalysts or for use in hydroprocessing such as hydrodenitrification, hydrodesulfurization, hydrodewaxing, hydrocracking or hydrogenation.

The physical properties such as surface area and pore size and pore size distribution can differ significantly not only between hydrogels and precipitates of silicas and mixed oxide silicas, but even between various types of precipitates depending on the treatment of the precipitates both during and after preparation, i.e., hot washing; hot aging, etc.

Certain silica and mixed oxide silica precipitates have now been discovered which have excellent thermal and physical stability, together with a relatively high amount of macroporosity so that these materials are particularly suited for use as catalyst support materials, especially for use in reactions involving relatively large molecules (e.g., residua) in order to allow the molecules easy ingress and egress.

The silica and mixed oxide silicas are characterized by being amorphous; having a non-particulate, dense, continuous network matrix, and having encapsulated regions with true macropores. Some of the silica and the silica-alumina precipitates have also been found to have sheet-like microstructures.

The new silicas and mixed oxide silicas have, in addition, certain characteristics in their preferred form as set forth below. These characteristics were determined after drying and calcining the silicas at 400° C. for 1 hour and mixed oxide silicas, i.e., silica-aluminas, at 593° C. for 2 hours.

(1) Surface area by the BET Method

Typically, the surface area of the new silicas and mixed oxide silicas is from about 150 to 600 $m^2/gm$.

(2) Macropore Volume by the Mercury Technique

By "macropore volume" in this specification is meant the volume occupied by pore sizes in excess of 1000 Å. It is particularly desirable for some end uses such as the polymerization of olefins to have a macropore volume in excess of 0.1 cc's per gram. The problem in the past was obtaining supports with a "true" macropore volume in excess of 0.1 cc's per gram along with physical stability. The silicas and mixed oxide silicas of this invention have a high macropore volume and are physically stable as shown by the fact they were successfully used in a fluid bed gas phase polymerization of ethylene.

The macropore volume is taken by the mercury porosimetry test (by ASTM Designation: D4284-88 where gamma is taken to be 473 dynes per cm and the contact angle is taken to be 140 degrees).

The macropore volumes of the new silicas and mixed oxide silicas are at most 0.5 cc's per gram.

(3) Mean Mesopore Diameter by the BET Method

The mean mesopore diameter of the silicas and mixed oxide silicas can be from 60 to about 250 Å.

(4) Fragmentation Potential and Sonication Number

The testing of catalysts so as to determine attrition characteristics is recognized in the art. These tests typically involve introduction of catalyst particles into a vessel and subsequent agitation of the particles. In such an arrangement, attrition results primarily from abrasion caused by particles impacting with each other as well as with the wall of the vessel.

For example, in processes where particles are subjected to fluidized bed conditions, fluidized tests such as air-jet testing are common in as far as they can be considered directly relevant to the performance of particles under such conditions.

While such tests can be effective in testing attrition under certain conditions, they have largely proven ineffective with respect to predicting the effectiveness of catalysts in processes where the attrition is related to the fractionation of the catalyst.

Moreover, such techniques fail to accurately report that polymerization catalysts, unlike catalysts employed in other processes,. e.g., catalytic cracking, are subject to attrition at two different stages, i.e., activation and polymerization. Thus, while traditional techniques, e.g., air-jet testing, may provide an effective model for attrition occurring during activation, such techniques are not an effective model for attrition occurring during polymerization and thus are not sufficient to deal with such catalysts.

One particular process in which fractionation of the catalyst occurs is the polymerization of olefins. Olefin polymerization processes are well recognized in the art. Typical examples of such processes include slurry batch, e.g., slurry loop and gas phase olefin polymerization processes.

Although each of these processes utilize catalysts in the production of polyolefins such as polyethylene, they differ significantly with respect to the dynamics of particle growth therein. For example, gas phase processes include as much as 85% ethylene while slurry loop type processes have a much lower ethylene solubility, e.g., typically 8% maximum. Accordingly, catalysts which may be effective in one olefin polymerization process may not be found effective in another process. The new silica supported polymer catalysts of this invention are effective in batch polymerization processes. One aspect of the present invention is based upon the surprising discovery that the "fragmentation potential" of catalysts, such as olefin polymerization catalysts, as determined by sonication, can be used in determining the expected efficiency of a catalyst in a process where fragmentation will occur.

The sonication process for use in the present invention can effectively be employed within any sonication environment with sonication baths, and in particular sonication baths employing water, being preferred.

This sonication test can then typically take on one of two forms. The material can be sonicated for a predetermined period of time, e.g., 30 minutes, and the increase in fines, e.g., percent increase, subsequent to sonication can be determined. This test directly provides what is called the "fragmentation potential".

Alternatively, the material can be sonicated for a period of time sufficient to reach a preselected mean particle size. The result of this particular test is called the "Sonication Number". Although this specification will typically make reference to the fragmentation potential, the concepts and advantages are the same for both of these basic tests.

In fact, as is readily apparent, these tests are basically analogous with the numerical results being inversely related. That is, a catalyst which has a small increase in fine production over a predetermined period of time will typically require a longer time to reach the preselected mean particle size. The inverse is also true; a catalyst having large percent increase in fine production will have a smaller relative period of time to reach the predetermined mean particle size.

The particular sonication test employed is not critical to the present invention and the selection of test and equipment is largely determined by practical considerations such as time allotted to perform the test.

For purposes of this specification, the "fragmentation potential" is defined as the percent increase in the percentage of particles which are smaller than 40 microns after sonication for 30 minutes in the aqueous medium, plus a dispersant using an Horiba LA 900 instrument. Calculation of the fragmentation potential, of course, involves taking the percent of particles which are smaller than 40 microns after 30 minutes and subtracting the percent of particles smaller than 40 microns in the sample before sonication. It was recognized that the initial sample could have some spheres of less than 40 microns agglomerated with somewhat larger spheres. A preferred variation is to initially degglomerate the sample by sonicating the sample for one minute to obtain a base value for the percent of particles smaller than 40 microns before sonicating for 30 minutes as described herein. In this instance, the fragmentation potential is calculated by taking the percent of particles smaller than 40 microns after 30 minutes and subtracting the percent of particles smaller than 40 microns in the sample after an initial one-minute sonication. The fragmentation potential using the preferred technique is lower, as expected. In the data to be given below, the fragmentation potential is given as (30-0) or (30-1), the "0" indicating no pre-sonication, and the "1" indicating a pre-sonication of one minute. In an analogous test, the sonication number is determined as the time for the mean particle size of a test sample to fall to 40 microns.

Preferably, the fragmentation potential is from 10 to 84 percent, more preferably above 30 percent, and most preferably above 30 to 60 percent.

Similarly, the Sonication Number is preferably from 5 to 200 minutes, more preferably from 10 to 150 minutes, and most preferably from 20 to 100 minutes. These numbers are obtained when using a Molvern Particle Size Analyzer with a 300 mm focal length and an active beam length of 2 mm.

The fragmentation potential and sonication numbers set forth above are for the silicas and mixed oxide silicas of this invention after calcining at 400° C. for 1 hour. The fragmentation potential and sonication number will, of course, vary depending on whether the catalyst base is tested before or after calcining; before or after the addition of chromia, etc. Likewise, the optimal fragmentation potential will differ from other bases such as silica.

While not wishing to be bound by any theory, it is believed the sonication technique is a unique tool for providing a fingerprint of an improved ethylene polymerization catalyst because of the shattering of the particles as shockwaves move through the internal pore structure. Accordingly, it is believed that such a process closely resembles the fracturing process which can occur during polymerization, i.e., the catalyst particle breakup due to the accumulation of polymer and pressure within the pore structure.

(5) Microscopy

The new silica and mixed oxide silica compositions of this invention possess very unique and important characteristics over the silicas and mixed oxide silicas of the prior art, i.e., the new silicas and mixed oxide silicas have a microstructure of encapsulated regions with true macropores within a non-particulate, dense, continuous network matrix. And in one embodiment, they also exhibit sheet structures.

Physically, the new silicas and mixed oxide silicas are spray dried to form a non-particulate, dense, continuous network matrix with encapsulated regions of true macropores. The mean mesopore diameter is in a range of from 60 to 250 Å. The microscopic examination of these regions is done using standard transmission electron microscope (TEM) techniques. For example, to observe the TEM specimen in the bright field imaging mode, it is necessary to prepare the TEM specimen by the microtomy technique.

The microtomy technique is a well established specimen preparation technique in the field of transmission electron microscopy. Its description can be found in standard reference published literature, for example, T. F. Malis and D. Steele, "Ultramicrotomy for Materials Science", in "Workshop on specimen preparation for TEM of materials II", ed. R. Anderson, vol. 199, Materials Research Symposium Proceedings (MRS<Pittsburgh, 1990) and N. Reid, "Ultramicrotomy", in the "Practical methods in electron microscopy" series, (ed. A. M. Glauert, publ. Elsevier/North Holland, 1975). Briefly, it involves embedding the sample in a resin, form a pellet by polymerizing the resin in a mold, then cut thin sections using a microtome equipped with a diamond knife. In the work for this specification, the resin used was L. R. White resin. The typical thin section would have a thickness of about 0.06 microns. Care needs to be taken to embed whole encapsulated regions in order that views of the entire random cross sections of the true macropores are presented. Furthermore, it is important that prudent sampling techniques be used to collect the sample to be used for the TEM specimen preparation step. The portion of encapsulated regions that were embedded should be selected from a sample by sequentially dividing the originally collected sample into quarter portions until the desired amount of material suitable for the embedding process is reached.

In the TEM examination of specimens, it is always a balance between the amount of details to be observed and the amount of material to be examined to ensure representativeness. To observe the increasing details of relevant microscopic features requires higher magnifications while this decreases the filed of view and the amount of material examined. However, a modern microscope allows the operator to easily change magnifications from 100× to 1,000,000×. It is standard practice to survey the sample at low magnifications, identify and confirm the views that are typical and representative of the sample, then increase the magnification as necessary to examine the details. Images will then be recorded to illustrate the characteristics of the sample. The recorded images (which usually are on a 3.25"×4" negative) are then printed and usually further magnified.

Such further magnification occurs by printing, for example, to an 8.5×11" print.

For the purposes of this specification, the images of photomicrographs have destination magnifications between 3000× and 150,000×. The term "destination magnification" refers to the final magnification of the printed image.

EXAMPLES

The invention will be further illustrated by the following examples, which set forth particularly advantageous method embodiments. While the Examples are provided to illustrate the present invention, they are not intended to limit it. The following are non-limiting examples of experiments involving the making and testing of both silicas and mixed silica oxides.

Tables 1 and 1A summarize the key process variables and the resulting physical properties of the formed and calcined $SiO_2$ powder resulting from the CHSG experiments. Examples 1 through 13 $SiO_2$ powders were formed by vacuum drying the gel-cake, and crushing and sizing. Examples 14 through 17 were spray dried with the Stork Bowen spray-dryer.

Both sets of samples were calcined at 400° C. for one hour prior to characterization.

Tables 2 and 3 summarize the observations associated with each of the CHSG, continuous, high shear, experiments.

TABLE 1

Summary of the Preparation Conditions for the $SiO_2$-bases of This Invention

| Example No | 1 | 2 | 3 | 4 | 5 | 6 | 7 | 8 |
|---|---|---|---|---|---|---|---|---|
| Notebook No | C1935-23A | C1935-23B | C1935-23N | C1935-31 | C1935-38A | C1935-38A | C1935-38B | C1935-38B(3) |
| I) Solutions | | | | | | | | |
| $Na_2O$:$SiO_2$, 1:3.22, Kg (Banco Sodium silicate 41 Be | 0.6831 | 0.6831 | 0.6831 | 1.591 | 1.75 | 1.75 | 1.75 | 1.75 |
| DI $H_2O$, Kg. | 2.5 | 2.5 | 2.5 | 7 | 7 | 7 | 7 | 7 |
| pH | 11.8 | 11.8 | 11.8 | 12.2 | 12.2 | 12.2 | 12.2 | 12.2 |
| w/w DI $H_2O$/$H_2SO_4$ | 3 to 1 | 3 to 1 | 3 to 1 | 6 to 1 | 6 to 1 | 6 to 1 | 6 to 1 | 6 to 1 |
| pH | 1.1 | 1.1 | 1.1 | 1.01 | 1.2 | 1.2 | 1.2 | 1.2 |
| II) Gelation | | | | | | | | |
| Stator configuration | Slot | Slot | Slot | Slot | Screen | Screen | Screen | Screen |
| RPM of Rotor | 7563 | 7563 | 7563 | 7723 | 7700 | 7700 | 7700 | 7700 |
| Apparent Average Shear Rate × $(10)^4$ | 5.36 | 5.36 | 5.36 | 5.48 | 5.46 | 5.46 | 5.46 | 5.46 |
| pH Range | 2 to 10 | 2 to 10 | 2 to 10 | 5 to 7 | 5 to 7 | 5 to 7 | 5 to 7 | 5 to 7 |
| Acid Rate, gm/min | 72 to 220 | 72 to 220 | 72 to 220 | 100 | 67 | 67 | 67 | 67 |
| Base Rate, gm/min | 630 to 670 | 630 to 670 | 630 to 670 | 548 | 351 | 351 | 351 | 351 |
| pH at outlet | — | — | — | 7.5 | 9 | 9 | 9 | 9 |
| Gel T, C. | 21 | 21 | 21 | 21 | 20 | 20 | 20 | 20 |
| III) Washing | | | | | | | | |
| Batch | Yes | Yes | Yes | Yes | Yes | Yes | Yes | Yes |
| Wash Solution | $NH_4$ Acetate | $NH_4$ Bicarbonate | $NH_4$ Nitrate | $NH_4$ Acetate | $NH_4$ Acetate | $NH_4$ Acetate | $NH_4$ Bicarbonate | $NH_4$ Bicarbonate |
| pH of Wash Solution | 7.3 | 8.4 | 5.3 | 7.3 | 7.3 | 7.3 | 8.4 | 8.4 |
| Wash Temperature, C. | Ambient | Ambient | Ambient | 50 | Ambient | 50 | Ambient | 50 |
| Conductivity of Water Wash | | | | | | | | |
| (1) Initial, mmhos/$cm^2$ | 8400 | — | 9250 | 8000 | 7000 | 10000 | 6800 | 7250 |
| (2) Final | 2300 | 1200 | 2600 | 2400 | 1950 | 2600 | 1350 | 500 |
| Water Wash Temperature, C. | Ambient | Ambient | Ambient | 50 | Ambient | 50 | Ambient | 50 |
| Diafiltration | No | No | No | No | No | No | No | No |
| Dilution, Wt % Solids (LOM) | | | | | | | | |
| Wash Solution | | | | | | | | |
| pH of Wash Solution | | | | | | | | |
| Conductivity of Water Wash | | | | | | | | |

(1) Initial
(2) Final
Water Wash Temperature, ° C.
Wt % Solids of Concentrate

TABLE 1-continued

Summary of the Preparation Conditions for the SiO₂-bases of This Invention

| Example No | 1 | 2 | 3 | 4 | 5 | 6 | 7 | 8 |
|---|---|---|---|---|---|---|---|---|
| Notebook No | C1935-23A | C1935-23B | C1935-23N | C1935-31 | C1935-38A | C1935-38A | C1935-38B | C1935-38B(3) |
| IV) Aging | | | | | | | | |
| pH | | | | | | | | |
| Acid/Base | | | | | | | | |
| Time, Min. | | | | | | | | |
| Temperature | | | | | | | | |
| V) Drying | 80° C. in Vacuum | 80° C. in Vacuum | 80° C. in Vacuum | 80° C. in Vacuum | 80° C. in Vacuum | 80° C. in Vacuum | 80° C. in Vacuum | 80° C. in Vacuum |
| VI) Physical Properties (2) | | | | | | | | |
| Surface Area (BET), m²/gm | 177 | 476 | 468 | 503 | 501 | 464 | 426 | 445 |
| Pore Volume (BET) cc/gm | 0.521 | 0.939 | 0.924 | 1.004 | 0.929 | 0.998 | 0.949 | 0.985 |
| MMPD, A | 128 | 100 | 96 | 81 | 96 | 115 | 117 | 119 |
| Particle size, microns | | | | | | | | |

AASR = Apparent Average Shear Rate, reciprocal seconds
(2) Measurement made after calcination for 1 hr at 400° C.

TABLE 1A

Summary of the Preparation Conditions for the SiO₂-Bases of This Invention

| Example No | 9 | 10 | 11 | 12 | 13 | 14 | 15 | 16 | 17 |
|---|---|---|---|---|---|---|---|---|---|
| Notebook No | C1935-43 | C1935-42 | C1936-50A | C1936-50B | C1936-50N | C1935-44B | C1935-44B | C1935-47 | C1935-48 |
| I) Solutions | | | | | | | | | |
| Na₂O:SiO₂, 1:3.22, Kg (Banco Sodium silicate 41 Be | 1.75 | 1.75 | 0.683 | 0.683 | 0.683 | 4.098 | | 4.098 | 4.098 |
| DI H₂O, Kg. | 7 | 7 | 5 | 5 | 5 | 15 | | 15 | 15 |
| pH | 12.2 | 11 | 11 | 11 | 11 | 11.2 | | 11.2 | 11.2 |
| w/w DI H₂O/H₂SO₄ | 6 to 1 | 6 to 1 | 3 to 1 | 3 to 1 | 3 to 1 | 6 to 1 | | 6 to 1 | 6 to 1 |
| pH | 1.2 | <0 | 1.3 | 1.3 | 1.3 | <0 | | <0 | <0 |
| II) Gelation | | | | | | | | | |
| Stator configuration | Screen | Screen | Screen | Screen | Screen | Slot | | Slot | Slot |
| RPM of Rotor | 7700 | 7800 | 2729 | 2729 | 2729 | 10200 | | 9923 | 9923 |
| Apparent Average Shear Rate × (10)⁴ | 5.46 | 5.53 | 1.93 | 1.93 | 1.93 | 7.23 | | 7.04 | 7.04 |
| pH Range | 5 to 7 | 6.9 to 8.5 | 5 to 7 | 5 to 7 | 5 to 7 | 2.3 to 4.8 | | 5.5 | 5.5 |
| Acid Rate, gm/min | 67 | 145 | 50 | 50 | 50 | 127 | | 150 | 150 |
| Base Rate, gm/min | 351 | 692 | 680 | 680 | 680 | 450 to 639 | | 650 | 650 |
| pH at outlet | 9 | 7.3 | — | — | — | 6.5 | | 4.1 | 4.1 |
| Gel T, ° C. | 20 | 23 | 24 | 24 | 24 | 30 | | 28 | 28 |
| III) Washing | | | | | | | | | |
| Batch | Yes | Yes | Yes | Yes | Yes | No | Yes | No | No |
| Wash Solution | NH₄ Bicarbonate | NH₄ Bicarbonate | NH₄ Acetate | NH₄ Bicarbonate | NH₄ Nitrate | | NH₄ Bicarbonate | | |
| pH of Wash Solution | 8.4 | 8.4 | 7.3 | 8.4 | 5.3 | | 7.9 | | |
| Wash Temperature, C. | 50 | 50 | Ambient | Ambient | Ambient | | 50 | | |
| Conductivity of Water Wash | | | | | | | | | |
| (1) Initial, mmhos/cm² | 7250 | 7250 | — | — | — | | 6700 | | |
| (2) Final | 500 | 500 | 2300 | 1400 | 1400 | | 1233 | | |
| Water Wash Temperature, C. | 50 | 50 | Ambient | Ambient | Ambient | | 50 | | |
| Diafiltration | No | No | No | No | No | Yes | | Yes | Yes |
| Dilution, Wt % Solids (LOM) | | | | | | 2 | | 3 | 3 |
| Wash Solution | | | | | | NH₄ Bicarbonate | | NH₄ Bicarbonate | NH₄ Bicarbonate |
| pH of Wash Solution | | | | | | 7.9 | | 8 | 8 |
| Conductivity of Water Wash | | | | | | | | | |
| (1) Initial | | | | | | 9360 | | — | — |
| (2) Final | | | | | | 300 | | 2000 | 2000 |
| Water Wash Temperature, ° C. | | | | | | 50 | | 50 | 50 |
| Wt % Solids of Concentrate | | | | | | 9 | | 8.84 | 8.84 |
| IV) Aging | Yes | | | | | No | No | Yes | Yes |
| pH | 5.1 | | | | | | | 5.6 | 9.6 |
| Acid/Base | Acetic acid | | | | | | | Acetic acid | NH₄ Hydroxide |
| Time, Min. | 10 | | | | | | | 30 | 30 |
| Temperature | 38 | | | | | | | 50 | 50 |

TABLE 1A-continued

Summary of the Preparation Conditions for the SiO₂-Bases of This Invention

| Example No | 9 | 10 | 11 | 12 | 13 | 14 | 15 | 16 | 17 |
|---|---|---|---|---|---|---|---|---|---|
| Notebook No | C1935-43 | C1935-42 | C1936-50A | C1936-50B | C1936-50N | C1935-44B | C1935-44B | C1935-47 | C1935-48 |
| V) Drying | 80° C. in Vacuum | 80° C. in Vacuum | 80° C. in Vacuum | 80° C. in Vacuum | 80° C. in Vacuum | Spray Dry | 80° C. in Vacuum | Spray Dry | Spray Dry |
| VI) Physical Properties (2) | | | | | | | | | |
| Surface Area (BET), m²/gm | 417 | 476 | 570 | 475 | 515 | 538 to 561 | 378 | 471 to 487 | 454 to 474 |
| Pore Volume (BET) cc/gm | 1.128 | 0.844 | 0.815 | 0.842 | 0.787 | 1.02 to 1.3 | 0.956 | 1.1 to 1.2 | 1.3 to 1.4 |
| MMPD, A | 162 | 79 | 67 | 82 | 71 | 101 to 140 | 114 | 140 to 167 | 151 to 167 |
| Particle size, microns | | | | | | 63 | | 49 | 60 |

AASR = Apparent Average Shear Rate, reciprocal seconds
(2) Measurement made after calcination for hr at 400° C.

TABLE 2

Comparison of the Physical Properties and the Microstructure of this Invention to Other Sources of SiO₂ Bases

| Source of SiO₂ | SiO₂-Dispersion | Commercial SiO₂ | Commercial SiO₂ | CHSG-Invention | | | | | |
|---|---|---|---|---|---|---|---|---|---|
| Example Sample ID | Comparative C1936-20-13 | Comparative EP-30x | Comparative EP-50 | 1 C1935-23A | 2 C1935-23B | 5 C1935-38A | 14 C1935-44B | 16 C1935-47B | 17 C1935-48B |
| Surface Area (BET) | 166 | 309 | 451 | 177 | 476 | 501 | 564 | 487 | 474 |
| Pore Volume, PV, (N₂) | 0.417 | 1.63 | 2.096 | 0.523 | 0.94 | 0.929 | 1.02 | 1.21 | 1.318 |
| Mean Meso Pore Diameter, Å | 113 | 206 | 183 | 128 | 100 | 96 | 101 | 140 | 151 |
| Geometric Pore Diameter, Å | 88 | — | 161 | 104 | 72 | 66 | 64 | 88 | 97 |
| Pore volume (N₂) > 100A | 0.2505 | — | 2.06 | 0.423 | 0.264 | 0.2199 | 0.2387 | 0.7187 | 0.88 |
| Pore volume (N₂) > 200A | 0.0082 | — | 0.395 | 0.0079 | 0.0319 | 0.04 | 0.0729 | 0.1554 | 0.188 |
| Pore volume (N₂) > 500A | 0.0029 | — | 0.0157 | 0.0021 | 0.0083 | 0.0083 | 0.0133 | 0.0275 | 0.037 |
| Fragmentation Potential (30-1 min) | — | — | '39 | — | — | — | 28 | 22 | 22 |
| "Apparent" Macro PV (Hg) > 1000A | Yes | Yes | Yes | — | — | — | Yes | Yes | Yes |
| Macro PV (Hg), cc/gm | 0.529 | 0.15 | 0.492 | — | — | — | 0.215 | 0.38 | 0.44 |
| "True" Macro PV (TEM) | No | ? | No | Yes | Yes | Yes | Yes | Yes | Yes |
| Microstructures (TEM) | | | | | | | | | |
| Particulates | x | x | | | | | | | |
| Continuous network matrix | | | x | x | x | x | x | x | x |
| Pockets (Lower density than matrix) | | | | x | x | x | x | x | x |
| Sheets | | | | x | x | | | | |

TABLE 3

TEM Characterization of SiO₂ Bases of the Prior Art and of this Invention

| Source of SiO₂ | SiO₂-Dispersion | Commercial SiO₂ | Commercial SiO₂ | CHSG-Invention | | | | | |
|---|---|---|---|---|---|---|---|---|---|
| Example Sample ID | Comparative C1936-20-13 | Comparative EP-30x | Comparative EP-50(SiO₂/TiO₂) | 1 C1935-23A | 2 C1935-23B | 5 C1935-38A | 14 C1935-44B | 16 C1935-47B | 17 C1935-48B |
| Particulates | x | x | | None | None | None | None | None | None |
| Size of Particulates, nm | 17 | N. A. | | | | | | | |
| Size of Pores (estimated) | 10 | | | | | | | | |
| Continuos network matrix | | | x | x | x | x | x | x | x |

TABLE 3-continued

TEM Characterization of SiO₂ Bases of the Prior Art and of this Invention

| Source of SiO₂ | SiO₂-Dispersion | Commercial SiO₂ | Commercial SiO₂ | CHSG-Invention | | | | | |
|---|---|---|---|---|---|---|---|---|---|
| Example Sample ID | Comparative C1936-20-13 | Comparative EP-30x | Comparative EP-50(SiO₂/TiO₂) | 1 C1935-23A | 2 C1935-23B | 5 C1935-38A | 14 C1935-44B | 16 C1935-47B | 17 C1935-48B |
| Density of Matrix | | | 3+ | 1 | | 3 | 2 | 2 | 4 |
| Size of Matrix Pores, nm | | | 20 | 8 | | 7 | 10 | 10 | 25 |
| Pockets | | | | x | x | x | x | x | x |
| Density of Pockets | | | | 5 | | 1 | 3 | 2 | 2 |
| Size of Pockets | | | | 1 | | 2 | 3 | 3 | 3 |
| Size of Pockets | | | | ~15 Microns | | ~10 Microns | <10 Microns | <10 Microns | <10 Microns |
| Porosity of Pockets | | | | 3 | | 1 | 3 | 2 | 2 |
| Size of Pocket Pores, Typical, nm | | | | 70 | | 85 | 20 | 30 | 80 |
| Size of Pocket Pores, Range, nm | | | | 30 to 120 | | 24 to 250 | 10 to 24 | 20 to 200 | 25 to 200 |
| Sheets | | | | x | x | | | | |
| Quantity of sheets | | | | Only occasionally observed | Only occasionally observed | | | | |
| Size of sheets | | | | About 0.02–0.15 microns thick and 5–10 microns length | About 0.1 microns thick and several microns long | | | | |

The General Procedure set forth above using the high shear mixer was employed with specific amounts of reactants; shear rate, etc. as set forth in Tables 1 and 1A above. The characteristics of the silica are summarized in Tables 1, 1A and 2.

Referring to Table 2, the silica possessed "true" macropore volume as observed by TEM. It also possessed a continuous network matrix, with pockets of less density and occasional "unique" sheet microstructures.

Table 3 summarizes the characteristics of the matrix, pockets and sheets as observed by TEM.

Examples 1-2-3

Example 1 was split in thirds. Example 2 was washed initially with an ammonium bicarbonate solution as noted in Tables 1 and 1A. Example 3 was washed initially with an ammonium nitrate solution as noted in Tables 1 and 1A. Both were then washed with DI water.

Referring to Tables 1 and 1A, Examples 2 and 3 had higher surface areas than Example 1; they had higher pore volumes; they had lower mean meso pore diameters. This shows that washing affects the physical properties of the silica.

Referring to Table 2, Example 2 possessed "true" macropore volume as observed by TEM. It also possessed a continuous network matrix with pockets of less density and occasional "unique" sheet microstructure. The "true" macropore volume of Example 2 was less than that of Example 1.

Table 3 summarizes the characteristics of the matrix, pockets and the sheets observed the TEM of Example 2. TEM showed that the density of the matrix of Example 2 was less than that of Example 1. However, the density of the pockets was higher. Example 2 had smaller pockets which contained smaller pores.

Chromium (III) acetate hydroxide was deposited onto the silica to result in 0.7 weight percent chromium. The silica was first calcined at 400° C. for 1 hour. The chromium compound was dissolved in methanol.

Example 4

Example 1 was repeated except for the differences noted in Tables 1 and 1A.

Examples 5–8

Example 1 was repeated using a screen stator and the differences noted in Tables 1 and 1A. All the silica powders were high surface area, 428 to 501 m²/gm. These examples illustrate the effects the washing solution, washing conditions and degree of washing have on the physical properties.

Referring to Table 2, Example 5 possessed a continuous network matrix, pockets, but no sheets. It also possessed "true" macropore volume.

Table 3 summarizes the characteristics of the matrix and the pockets observed in the TEM of Example 5. Example 5 had the least dense matrix, compared to Examples 1 and 2. Example 5 had the most porous pockets with pores ranging from 24 to 250 nm (240 to 2500 Å).

Example 9

Example 5, 20 grams, was blended with 400 grams of DI water and acetic acid in a Waring Blender. The pH was about 5.1. The mixture was blended for about 12 minutes. The final temperature was 38° C. The blend was filtered. The gel-cake was vacuum dried at 80° C. overnight. It was then calcined at 400° C. for one hour and then ground and sized. Compared to Example 5, Example 9 had a lower surface area, 417 m$^2$/gm versus 501 m$^2$/gm. But Example 9 had both a larger pore volume, 1.128 cc/gm versus 0.929 cc/gm, and a bigger MMPD, 182 Å versus 96 Å.

Example 10

Example 10 was essentially a repeat of Example 8 except for the differences noted in Tables 1 and 1A.

Examples 11–13

The General Procedure set forth above using the high shear mixer was employed with the specific amounts of reactants; shear rate, etc., as set forth in Tables 1 and 1A above. These silicas were prepared at a low AASR employing the screen stator.

Referring to Tables 1 and 1A, which summarizes silica characteristics, all these silicas were high surface area, greater than 470 m$^2$/gm.

Examples 14, 16 and 17 were washed by difiltration and formed by spray drying.

Example 14

The General Procedure set forth above using the high shear mixer was employed with the specific amounts of reactants, shear rate, etc., as set forth in Tables 1 and 1A above.

Referring to Tables 1 and 1A, this silica powder had higher surface area, more pore volume, and a larger MMPD than the previous examples, illustrating the impact of washing by difiltration and forming by spray drying.

Referring to Table 2, the silica powder possessed macropore volume as measured by mercury porosimetry, about 0.215 cc/gm. It also possessed "true" macropore volume as observed by TEM. It was comprised of a continuous network matrix and pockets of less dense material. The fragmentation potential of this powder was 28.

Table 3 summarizes the characteristics of the matrix and pockets as observed by TEM.

Chromium (III) acetate hydroxide dissolved in methanol was deposited onto the silica powder to result in 1.0 weight percent chromium catalyst. Chromium (III) acetate hydroxide dissolved in DI water also was deposited onto Example 14 to result in a second 1.0 weight percent chromium catalyst.

Example 15

A portion of Example 14 was batch washed as set forth above in the General Procedure, and formed after vacuum drying by grinding the gel-cake as set forth in Tables 1 and 1A above.

Referring to Tables 1 and 1A, this silica powder, compared to Example 14, had a lower surface area, 378 m$^2$/gm versus ~550 m$^2$/gm, a lower pore volume, 0.958 cc/gm versus about 1.2 cc/gm, and smaller MMPD.

Example 16

Example 14 was repeated using the differences noted in Tables 1 and 1A above. Acetic acid was added to the gel and enough DI water to allow for mixing with a Marine impeller mixer. (The pH of the slurry adjusted to 5.6.) The mixture was heated to 50° C. over 15 minutes and held at that temperature for about 15 minutes. The slurry was spray dried.

The characteristics of the silica powder are summarized in Tables 1, 1A, and 2.

Referring to Table 2, Example 16, compared to Example 14, had a lower surface area, 487 m$^2$/gm compared to 564 m$^2$lgm, but the pore volume was larger, 1.21 cc/gm versus 1.02 cc/gm, and the MMPD was bigger, 140 Å versus 101 Å. The "apparent" macropore volume was also larger, 0.38 cc/gm compared to 0.215 cc/gm. Example 16 had "true" macropore volume as observed by TEM. This clearly illustrates the benefit of hot aging in acid conditions. The fragmentation potential of this powder was 22.

Table 3 summarizes the characteristics of the matrix and the pockets. The hot aging in acid pH changed the characteristics of the pockets. Compared to Example 14, Example 16, after aging as described above, had more porous pockets with larger typical pores, 300 Å versus 200 Å, and a wider range of pores in the pockets, 200 Å to 2000 Å versus 100 Å to 300 Å.

Example 17

Example 14 was repeated using the differences noted in Tables 1 and 1A above. Ammonium hydroxide was added to the material of the gel and enough DI water to allow for mixing with a marine impeller mixer. The pH was adjusted to about 9.6. The mixture was heated to 50° C. over 15 minutes and held at 50° C. for 15 minutes. The slurry was spray dried.

The characteristics of the silica powder are summarized in Tables 1, 1A, and 2.

Referring to Table 2, Example 17 compared to Example 14, had a lower surface area, 474 m$^2$/gm to 564 m$^2$/gm, but the pore volume was larger, 1.318 cc/gm versus 1.02 cc/gm, and the MMPD was bigger, 151 Å versus 101 Å. The "apparent" macropore volume was also larger, 0.44 cc/gm versus 0.215 cc/gm. Example 17 had "true" macropore volume as observed by TEM. This clearly illustrates the benefit of hot aging in base conditions. The fragmentation potential of this powder was 22.

Table 3 summarizes the characteristics of the matrix and the pockets. The hot aging in base pH changed the characteristics of both the matrix and the pockets. The density of the matrix decreased and the size of the matrix pores increased to 250 Å compared to 100 Å for Example 14. Compared to Example 14, Example 17, after aging as described above, had more porous pockets with larger typical pores 800 Å versus 200 Å, and a wider range of pores in the pockets, 250 to 2000 Å versus 100 to 300 Å.

Chromium (III) acetate hydroxide dissolved in methanol was deposited onto Example 17 to result in 1.0 weight percent chromium.

Silicas of this invention, such as Examples 1, 2, 7 and 14, made via gelation of sodium silicate (base side) by sulfuric acid under shear conditions contain the microstructures described above. This is in contrast to a commercial silica base used for ethylene polymerization described in Example 19 which contain neither the sheets nor the encapsulated, non particulate regions with true macropores.

This is also in contrast to experimental materials made from commercial dispersions and blends of those dispersions.

Comparative Example 18

Gelling Commercially Available SiO$_2$ Dispersions

Two dispersions and mixtures thereof were used, with the SiO$_2$ in each dispersion having a different microstructure.

They were (1) Nyacol colloidal silica, 40 Wt. % $SiO_2$ (amorphous) with a spherical structure; and (2) Snowtex-UP, 20–21 Wt. % $SiO_2$ (amorphous) with a fiber structure. In order to achieve the gelling of each dispersion, it was necessary to determine the acceptable concentrations of the reacting $SiO_2$s, the pH, the temperature, and the type of mixing to achieve gelation in a reasonable time. This was accomplished by using a heated glass reactor fitted with a marine-impeller mixer or polytron mixer and a means to gradually adjust the pH of the reaction. Because the dispersions contained minimal amounts of residual salts, washing the resulting gel was not necessary.

Comparative Table 4 summarizes the key process variables and the resulting microstructure of the formed and calcined $SiO_2$ powders resulting from the experiments done with the commercial $SiO_2$ dispersions. All the gel slurries were formed by spray drying with the Yamato spray dryer, Model DL-41 and the resulting powders were calcined in a muffle furnace at 400° C. for one hour. The experimental $SiO_2$'s (comparative examples) made from commercially available dispersions are as follows:

(1) 1936-21-32, made from 100 Wt. % Snowtex (fibers);
(2) 1936-45, made from a 50/50 blend of Snowtex (fibers) and Nyacol (spheres);
(3) 1936-20-13, made from 100 Wt. % Nyacol (spheres).

COMPARATIVE TABLE 4

| Sample | 1936-21-32 | 1936-45 | 1936-20-13 |
| --- | --- | --- | --- |
| Gel pH | 4.93 | 5.6 | 5.13 |
| Temp. ° C. | 58 | 50 | 38 |
| Gel time | Overnight | 6 min | 39 min |
| Mixer | Polytron | Marine impellar | Polytron |
| Blend | 100% Snowtex | 50% Snowtex/50% Nyacol | 100% Nyacol |
| Particulate size: | <100 Å | >100 Å | ~170 Å |
| MMPD, Å | 144 | 78 | 113 |
| Packing: | Densely packed | Densely packed with large cracks in about ⅓ of the larger formed particles | Densely packed with uniformly formed spheres |

Comparative Example 19

Physical and Microstructural Characteristics of the Silicas of this Invention Compared to Commercially Available Silicas and Silicas Made from Silica Sols $SiO_2$ powders of Comparative Table 4 were characterized. The characterization can be broken down into three categories: commercial $SiO_2$ (commercial dispersions and blends), and experimental $SiO_2$ (commercial dispersions and blends), and experimental $SiO_2$ (silica salt/CHSG). The commercial materials are EP 30x and EP-50. The experimental $SiO_2$'s (comparative examples) made from commercially available dispersions are as follows:

(1) 1936-21-32, made from 100 Wt. % Snowtex (fibers);
(2) 1936-45, made from a 50/50 blend of Snowtex (fibers) and Nyacol (spheres);
(3) 1935-11, made from a 25/75 blend of Snowtex (fibers) and Nyacol (spheres); and
(4) 1936-20-13, made from 100 Wt. % Nyacol (spheres).

The experimental $SiO_2$'s made by gelling sodium silicate with acid via CHSG are 1, 2, 5, 14, 16 and 17. The TEM data for several of these bases is summarized below.

The matrix of EP-30x was mostly made up of individual particles of irregular shapes and sizes. There were some areas where the particles appeared to be sintered together and resembled the appearance of the continuous network. These areas were only a small fraction of the total volume of the sample.

EP-50 was made up of a continuous porous network of amorphous $SiO_2$. The pores appear to be about 200 Å. This is consistent with the value obtained via BET, about 183 Å. EP-50 contains $TiO_2$. The TEM analysis suggests that the $TiO_2$ is present as a second phase in the form of fine particles of about 10 Å and less in size.

The $SiO_2$ bases made from the dispersions and spray dried via the Yamato appeared as smooth rounded macroscopic particles of uniform density. The larger spray dried particles, 5–20 microns, are made up of smaller, densely packed individual particles.

The different microstructures of the starting dispersions affect the size of the particulates present in the microstructure. In fact, it looks like the ratio of the fibers to spheres affects size and the packing of the particulates in the microstructure: the amount of cracking in the spray dried particles increases with the amount of fibers, Snowtex, present in the blend.

The spray-dried $SiO_2$'s made from CHSG exhibit different microstructures from the preceding materials. They consist primarily of a non-particulate, dense, continuous-network matrix and not individual, fundamental particles. The secondary structure is composed of pockets of less density, non-particulate regions with true macropores. The size of these pockets, ranging from 2 μm to 15 μm, varies with the preparation conditions. The density of the non-particulate, dense, continuous-network matrix also varies with the preparation conditions. Examples 1, 2, 5 and 14 (V*SEP) have the microstructures described above.

However, Examples 1 and 2 display a "unique" sheet structure also. They contain a few sheets which are 0.02 to 0.1 microns thick and about 5–10 microns long.

Example 20

Physical Properties of the Dried/calcined Powders Made from Sodium Silicate Under Mixing with Shear The range of the key physical properties achieved with the above-described methods of the present invention described in Examples 1–17 were measured as:

(1) surface areas from 150 to 600 $m^2/gm$;
(2) mean mesopore diameter (MMPD) from 60 to about 250 Å;
(3) varying modality of the pore size distribution from mono-modal to multi-modal;
(4) measured pore volume ($N_2$) from 0.5 to 1.5 cc/gm;
(5) macropore volumes (Hg) up to 0.5 cc/gm;
(6) median particle size from 7 to 63 microns; and
(7) fragmentation potential from about 20 to about 30.

Example 21

TEM Characterization of $SiO_2$ Bases

The microstructure of $SiO_2$ base samples was evaluated with respect to:

(a) the presence of pockets of different densities in the matrix;
(b) the density of packing in the matrix; and
(c) the presence of sheet structures.

Specifically, the typical sizes of the pores in the pockets and in the matrix were estimated. An assessment of whether there were true macropores was also made. As a comparison to the SiO$_2$ bases of this invention, experimental SiO$_2$ bases (e.g., 1936-20-13) made from commercially available dispersions and commercial SiO$_2$ bases (EP-30x and EP-50) were also examined.

Figure 3:
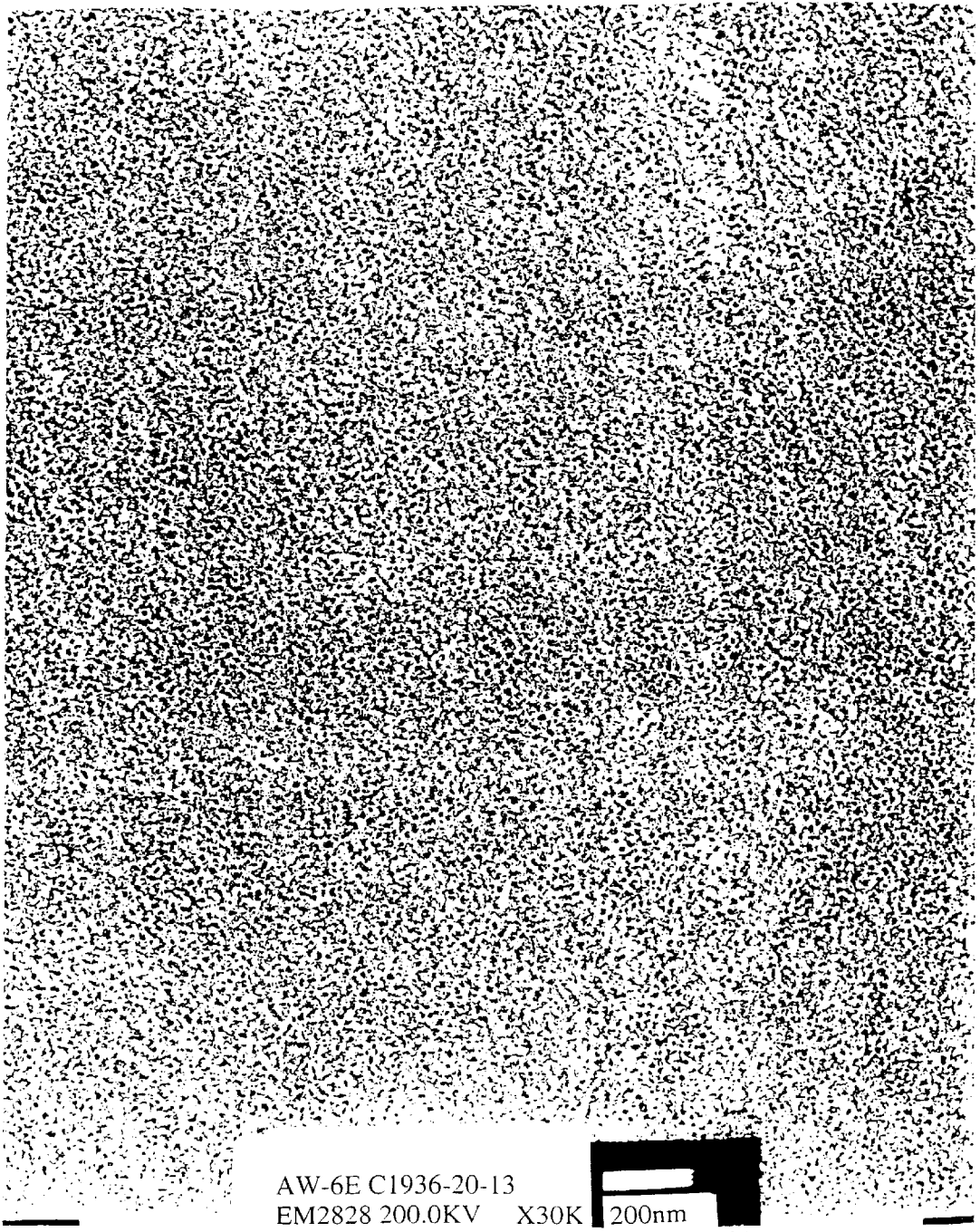
FIG. 3 is a TEM Photomicrograph of Example Sample C1936-20-13 (EM 2829) taken at magnification 30 KX. It shows the particulate nature of the sample.
Figure 4:
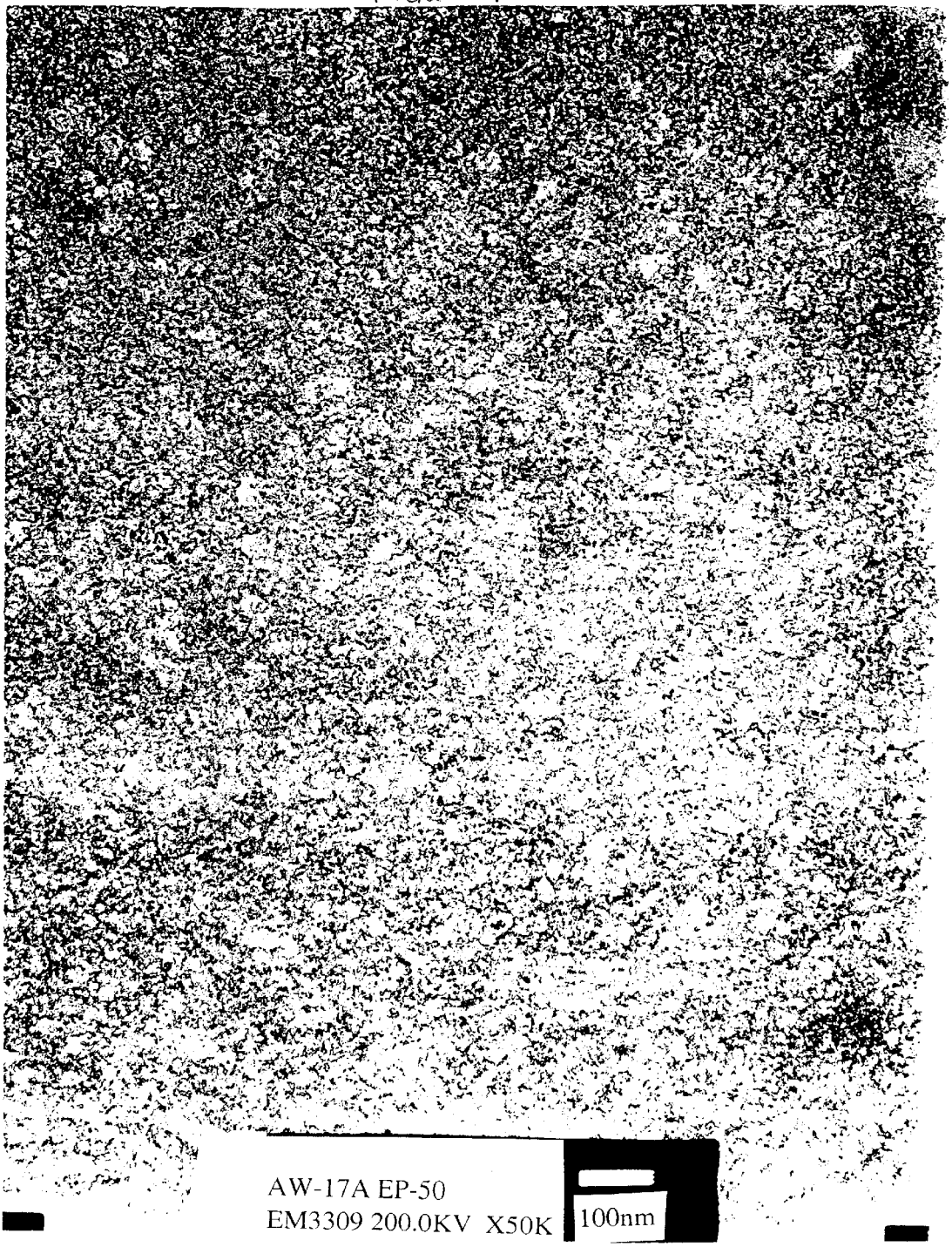
FIG. 4 is a TEM Photomicrograph of Example Sample EP-50 (EM 3309) taken at magnification 50 KX. It shows the gel network and small $TiO_2$ particles.
Figure 5:
FIG. 5 is a TEM Photomicrograph of Example Sample C1935-23B (EM 3821) taken at magnification 5 KX. It shows pockets and sheets.

The comparison results are summarized in Tables 2, 2A and 3. EM 2829 (1936-20-13) (FIG. 3) clearly showed that the experimental SiO$_2$ base made from silica dispersion was made up of particulates, while EM 3309 (EP-50) (FIG. 4) showed that the matrix of EP-50 was made up of a continuous network. For EP-30x, its matrix was made up of mostly individual particulates. However, the shape and size of these particulates were not as homogeneous as those in 1936-20-13. In some areas, the particulates appeared to be partially sintered and resembled the continuous network. The matrices of all of the examples in this invention were made up of continuous networks. In addition, they all contained pockets where the density of packing was lower than the surrounding matrix. The number density of the pockets in the matrix (frequency of occurrence), the size of the pockets, and the porosity of the pockets were evaluated in a numerical relative ranking from 1 to 5. It should be noted that the ranking scale was neither linear nor proportional. It only served to indicate an observable relative difference. Furthermore, sheet structures were observed in the Examples 1 and 2 samples 1935-23A and 1935-23B. A photomicrograph of Example 2 1935-23B, EM 3821, is included as FIG. 5. The true macropores were typically located in the pockets. They can be recognized as empty spaces in the silica framework in the low magnification images.

Figure 6:
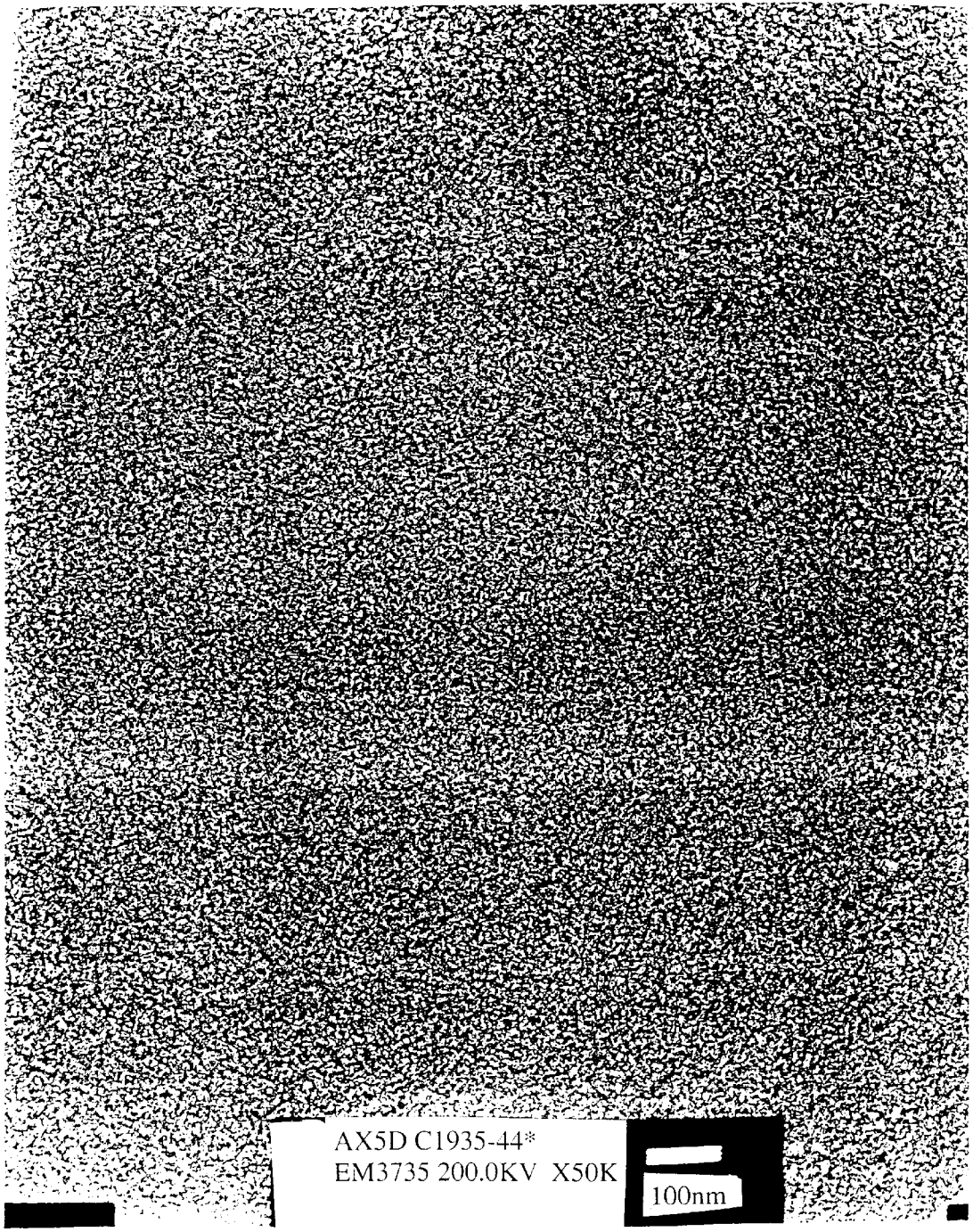
FIG. 6 is a TEM Photomicrograph of Example Sample C1935-44B (EM 3735) taken at magnification 50 KX. It shows the pore size in the matrix.
Figure 7:
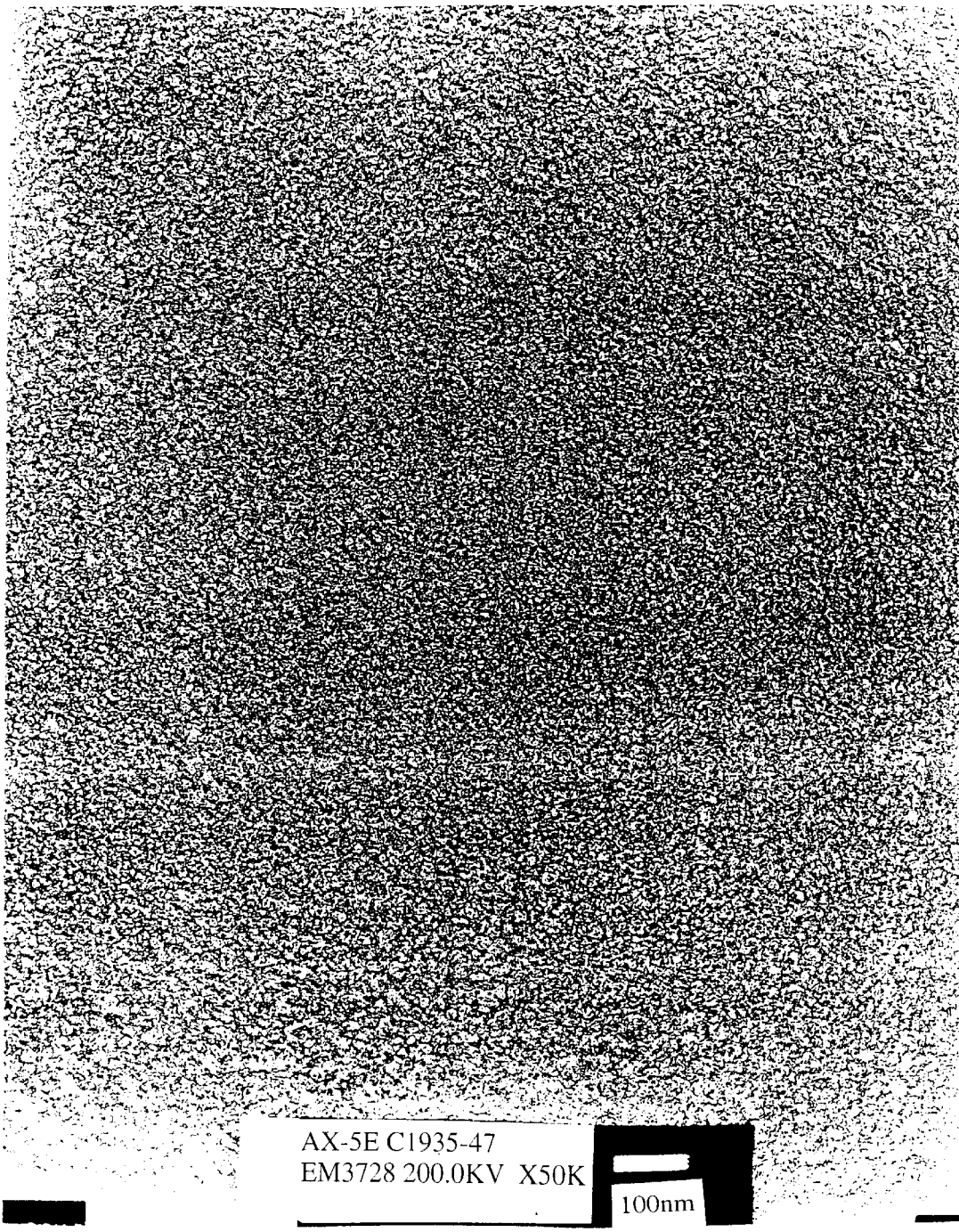
FIG. 7 is a TEM Photomicrograph of Example Sample C1935-47B (EM 3728) taken at magnification 50 KX. It shows the pore size in the matrix getting bigger than in FIG. 6.
Figure 8:
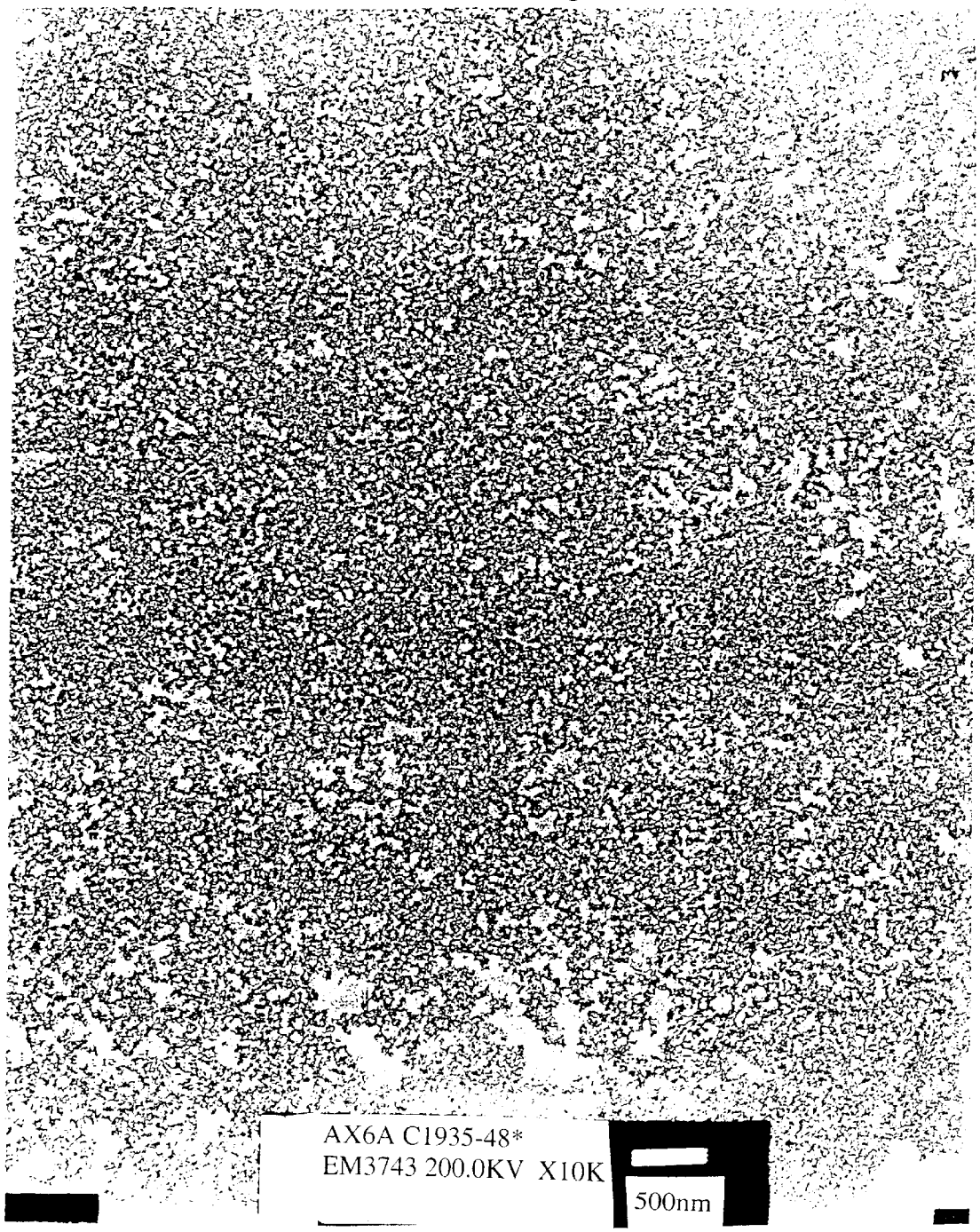
FIG. 8 is a TEM Photomicrograph of Example Sample C1935-48B (EM 3743) taken at magnification 50 KX. It shows the pore size in the matrix getting even bigger than in FIG. 7.

The difference in the effects between aging in acid and aging in base was clearly observed and illustrated by comparing Example 1935-44B (EM 3735) (FIG. 6), Example 1935-47B (EM 3728) (FIG. 7), and Example 1935-48B (EM 3743) (FIG. 8). Aging in acid did not change the microstructure of the matrix but increased the pore size in the pockets slightly. Aging in base increased the pore sizes significantly in both the matrix and the pockets.

Example 22

Batch Reactor Evaluation of Large Pore Silica Catalyst Bases

Three experimental catalysts were evaluated for their reactivity (activity compared to a Benchmark EP-30X 1.0% chromium catalyst) at constant ethylene maximum consumption, reactor volume, heptane addition, agitation via stirring, ethylene pressure, and aluminum to chrome ratio. The catalysts were activated at either 600° C. or 800° C. as indicated in Table 5 below which summarizes the reactor results. EP-30X, a commercial catalyst discussed above in Example 21, was the benchmark catalyst. The experimental catalysts 1935-48B (a catalyst of the present invention discussed above in Example 21), 1935-44 (a catalyst of the present invention also discussed above in Example 21), 1934-44 (also a catalyst of the present invention) were compared to it. The activity of the catalyst on a gram of polymer per gram of chromium varied with the catalyst.

The catalyst activations were performed on a bench-scale 28 mm diameter fluidized bed under a stream of dry air at either 600° C. or 800° C. for 8 hours. The activator tube is constructed from a 28 mm diameter quartz frit, and a 67 mm diameter quartz disengaging section. The fluidization section is 300 mm long from the frit to the half angle transition, and the disengaging section is 400 mm tall. The transition incorporates an 11° half angle for ideal transition in fluidized bed design. The whole activator tube is enclosed in a Lindberg furnace and can be purged with argon or low dew point air, typically ~1 L/minute. Gas flow direction is from the bottom to the top, and a cyclone trap is connected to the outlet to collect fines, which might otherwise escape into the atmosphere. This scaled-down activation protocol mirrors that used in the 4" and 6" activators at the Orange, TX, pilot plant.[1]

Polymerizations were performed in 2 L autoclave reactors equipped with Genesis control systems. A dried 316ss 2 L Autoclave Engineers Zipperclave reactor system is heated at 80° C. in-vacuo until a pressure of <50 mtorr is achieved. The reactor is then charged with a solution of 0.2885 M 0.65 IBAO in 100 ml of heptane and a slurry of experimental catalyst in 100 ml heptane. The IBAO and catalyst amounts vary in $\mu$L and grams respectively to give an Al to Cr proportion of 8.4 indicated in Table 5 below. The IBAO solution and Catalyst slurry were contained in a 500 ml glass addition funnel that is fitted with a Kontes vacuum valve. The Kontes valve is connected to the reactor on a Cajon Ultra-Torr fitting, and the mixture is introduced into the reactor in-vacuo. The reactor is stirred at 550 rpm and ethylene is introduced to an internal setpoint pressure of 300 psi. The reactor temperature is maintained at the setpoint temperature of 80° C. with a Neslab RTE-100 silicone or water-bath circulator. The reactor is allowed to proceed to a given productivity, typically depletion of 80 L of ethylene, after which the reactor is vented and purged three times with argon and shut down. The reactor is opened while it is still hot and the contents are quickly removed. The reactor is cleaned and prepared for the next reaction.[1]

[1] The description of the activation technique and batch reactor setup and conditions are similar to previous work completed by Ed Vega for Pamela Auburn and Theresa Pecoraro in "Alpo Catalyst Batch Screening Studies", April 1994 and are reprinted here with permission from Pamela Auburn. Referring to Table 5, it can be seen that activity of the experimental catalysts are superior to the commercial benchmark.

TABLE 5

Experimental Batch Reactor Runs for Large Pore Silicas

| Sample ID | Run number | Prior oxidation | Activation (degrees C.) | Weight % Cr | IBAO co-cat. soln. ($\mu$l) | Catalyst (g) | Al/Cr ratio | Polymer Yield (g) | Run Time (hr) | Liter C$_2$ = consumed | Activity (g/g/hr) | Activity (g/mol/hr) | Reactivity |
|---|---|---|---|---|---|---|---|---|---|---|---|---|---|
| EP30X | 8 | III | 800 | 1.0 | 590 | 0.150 | 5.9 | 109.16 | 1.15 | 80.10 | 632.8 | 26.5 | 1.0 |
| EP30X | 15 | III | 800 | 1.0 | 590 | 0.150 | 5.9 | 114.03 | 1.07 | 80.10 | 710.5 | 29.8 | 1.1 |
| C1935-48 MEOH | 16 | III | 600 | 1.0 | 700 | 0.125 | 8.4 | 108.30 | 0.76 | 81.68 | 1140.0 | 39.1 | 1.8 |

TABLE 5-continued

Experimental Batch Reactor Runs for Large Pore Silicas

| Sample ID | Run number | Prior oxidation | Activation (degrees C.) | Weight % Cr | IBAO co-cat. soln. (μl) | Catalyst (g) | Al/Cr ratio | Polymer Yield (g) | Run Time (hr) | Liter C$_2$ = consumed | Activity (g/g/hr) | Activity (g/mol/hr) | Reactivity |
|---|---|---|---|---|---|---|---|---|---|---|---|---|---|
| C1934-44 MEOH | 22 | III | 600 | 1.0 | 700 | 0.125 | 8.4 | 95.17 | 0.67 | 80.64 | 1136.4 | 39.5 | 1.8 |
| C1935-44 H$_2$O | 23 | III | 600 | 1.0 | 700 | 0.126 | 8.3 | 180.27 | 0.88 | 96.40 | 1625.8 | 47.6 | 2.6 |

Constants:
80 L C$_2$ = consumption
2 L reaction vessel
80 degree Celsius reaction vessel
300 psi initial C$_2$ = addition
5500 rpm agitation via stirring
200 ml heptane (100 ml soln w/ IBAO and 100 ml slurry w/ catalyst)
0.2885 molar IBAO co-catalyst standard solution Gelling Mixed Silica-oxide Salts It is also possible to form gels from an acidic mixture of oxide precursors and a sodium silicate plus acid by adding a base such as ammonium hydroxide. In this case the acidic solution contained both a silica and an alumina precursor. The basic solution was ammonium hydroxide. The acid and base solutions were mixed with high-shear, continuous gelation (CHSG) using a two-stream feed system pumped directly into a Ross mixer (reactor) as described above. This resulting silica-alumina contained a unique sheet-like structure.

Example 23

Procedure for Preparing SiAl of Prior Art

The following is a description of the procedure by which Example 1252-36B, a conventional silica alumina, 60:40 wt ratio, was prepared. Some of the process steps described below were used to prepare the silica-alumina samples of the present invention.. The difference was that the materials of the present invention were prepared in the presence of mixing with shear forces.

| I - Starting Materials | | |
|---|---|---|
| Material | Source | Key Concentration |
| Aluminum Chloride 32 BE | Reheis | 10.8% Al$_2$O$_3$ |
| Glacial Acetic Acid | JT Baker | 99.9% |
| Sodium Silicate 41 BE | VWR | 40% w/v Sodium Silicate |
| Ammonium Acetate Solution | Amresco Inc. | 65% solution |

II—Gelation
1. Add 22.2 lb. of DI water to a 55-gallon tank and turn on the mixer (Nettco Model NSP 050 mixer).
2. Add 53.92 lb. of aluminum chloride solution to the DI water.
3. Add 4.05 lb. of acetic acid to the aluminum chloride solution and record the pH. It should be <0.
4. In a separate tank make up a sodium silicate solution by mixing 23.34 lb. of sodium silicate with 126.4 lb. of DI water. Record the pH. It should be around 12.
5. Pump the sodium silicate solution into the aluminum chloride solution at approximately 5 lb./min. with a Masterflex magnetic drive vein pump. NOTE: If the silicate solution is added too quickly, it may come out of solution. The resulting solution should be clear. Measure and record the pH. It should be around 2.8.
6. Make up a solution of ammonium hydroxide which is 1 part NH$_4$OH and 3.205 parts DI water w/w. It will take approximately 90 lb. of the ammonium hydroxide solution to do the titration. Make an excess of ammonium hydroxide. Record the pH.
7. Begin the titration by pumping the ammonium hydroxide solution into the acid solution (from step 3) at 918 ml per minute. Titrate to a pH of 8.0. The titration was done in a 100-gallon tank using a Lightnin Model XD-43 mixer running at about 1788 RPM.

The following titration table is typical:

| Time min. | Base Added lb. | pH |
|---|---|---|
| 0 | 0 | 2.8 |
| 7 | 9.2 | 3.06 |
| 19 | 23.1 | 3.42 |
| 35 | 42.7 | 3.92 |
| 56 | 64.8 | 4.9 |
| 66 | 75 | 6 |
| 72 | 81.6 | 8 |
| 80 | 89.1 | 8.03 |

8. At the end of the titration, add ammonium hydroxide as necessary to maintain a pH of 8.0 for 3 hours. It should take about 1.6 lb. of base over 3 hours to keep the pH at 8.0. The pH will drift the most during the first hour. After 2 hours, the pH should be fairly stable.
9. At the end of three hours, begin washing the gel-slurry.

III—Quenching: Not applicable.

IV—Washing: Difiltration

The gel-slurry was washed with an ammonium acetate solution consisting of 1.8 liters of 65% ammonium acetate solution in approximately 55 gallons of DI water followed by a DI water wash. Used New Logic's V*SEP difiltration equipment.

On day one, the gel was washed with 256 liters of acetate solution for one hour. The conductivity went from 51,300 mmhos to 29,000 mmhos. The next day, the gel was washed with 398 liters of the acetate solution over 2 hours. The conductivity decreased to 11,000 mmhos. At 11,000 mmhos, the wash liquid was changed to DI water. The gel was washed with 719 liters of DI water over 4.5 hours to a conductivity of 958 mmhos. On day three, the wash continued using 183 liters of DI water over 1 hour to decrease the conductivity to the target of 600 mmhos.

Acidification/Concentration

The gel-slurry was acidified in a 20-gallon tank with mixing by an air driven mixer with a marine impeller. Approximately half of the slurry was acidified to a pH of 5.6 with 96.3 grams of acetic acid. The acid was added in two increments of 71.3 and 25 grams. The first acid addition was dumped in all at once. The second addition was added slowly until the pH reached 5.6.

The acidification process takes about 20–30 minutes. During that time, the gel is being de-watered. Once a stable pH of 5.6 is reached, the dewatering goes on for another 5–10 minutes before the gel gets too thick to pump out of the mixing tank. The final concentration was 8.6% solids by LOM.

The other half of the gel-slurry was acidified the following day to a pH of 5.6 with 106 grams of acetic acid. The acid was added in increments of 35.5 g, 28.3 g and 42.2 g. The first two acid additions were dumped in all at once. The last addition was added slowly until the pH reached 5.6.

Again, the gel-slurry was dewatered during the process to a final concentration of 8.6% solids by LOM.

V—Aging: None.

VI—Spray Drying

The slurry was spray dried separately with a Stork Bowen Model BE 1235 Spray Dryer.

Calcination

The powder was calcined in air in a fixed fluidized bed reactor. The calcination is an automated process which follows the following program:

Program 15 minute ramp to 213° F. 1 hour hold.

20 minute ramp to 482° F. 1 hour hold.

20 minute ramp to 762° F. 1 hour hold.

20 minute ramp to 1100° F. 2 hour hold.

Cool to room temperature.

Table 6 summarizes the key process variables and the resulting physical properties of the formed and calcined silica alumina powders resulting from the CHSG experiments. Example 23 represents the prior art. Examples 24 and 25 represent material of this invention, 1934-45 and 1935-13AF. Tables 7 and 8 summarize the observations associated with each of the CHSG, continuous, high shear, experiments.

Example 24

This Invention

The same starting materials were used as above.

26.96 lbs of $AlCl_3$ solution was added to 14.4 lbs of DI water. The acetic acid, 918 grams, was added to the aluminum solution. The pH was less than zero. 11.18 lbs of the sodium silicate was added to 63.2 lbs of DI water with mixing. The silicate solution was pumped into the aluminum-acetic acid solution over a period of fifteen minutes with mixing. The pH was about 2.3. An ammonium hydroxide: Di water solution was prepared by a 1 3.205 w/w dilution. The pH was 11.6. The acid and the base solutions were pumped into the Ross high-shear mixer-reactor. The specifics are summarized in Table 6. The gel from the reactor was collected in a tank of DI water with mixing. Acetic acid was added to keep the pH at 8.0. The pH was maintained at 8.0 for one hour before washing.

The remaining process steps were similar to Example 23. Table 6 contains the specifics.

Example 25:

This Invention

The same starting materials were used as above.

26.96 lbs. of $AlCl_3$ solution was added to 16.69 lbs of DI water. The acetic acid, 918 grams, was added to the aluminum solution. The pH was less than zero. 11.18 lbs of the sodium silicate was added to 63.2 lbs of DI water with mixing. The silicate solution was pumped into the aluminum-acetic acid solution over a period of fifteen minutes with mixing. The pH was about 2.3. An ammonium hydroxide: DI water solution was prepared by a 1 to 3.205 w/w dilution. The acid and the base solutions were pumped into the Ross high-shear mixer-reactor. The specifics are summarized in Table 6. The remaining process steps were similar to Example 23. Table 6 contains the specifics.

TABLE 6

Preparation Conditions for the Silica/Alumina Bases of this Invention

| | Prior Art | This Invention | |
|---|---|---|---|
| Example No | Comparative: 23 | 24 | 25 |
| Notebook No | 1252-36B | 1934-45 | 1935-13AF |
| I) Solutions | | | |
| A) Al solution | | | |
| 32 Be $AlCl_3$, Lb. | 53.92 | 26.96 | 26.96 |
| Glacial Acetic Acid (99.9%), Lb | 4.05 | 2.025 | 2.025 |
| DI $H_2O$, Lb | 22.2 | 14.1 | 16.7 |
| pH | <0 | <0 | <0 |
| B) Si Solution | | | |
| $Na_2O.SiO_2$, 1:3.22, Lb (Banco Sodium silicate, 41 Be) | 23.34 | 11.18 | 11.18 |
| DI $H_2O$, Lb | 126.4 | 63.2 | 63.2 |
| pH | 12 | 11.6 | 11.5 |
| C) $NH_4OH$ Solution | $NH_4OH$: DI $H_2O$ = 1:3.205 w/w | $NH_4OH$: DI $H_2O$ = 1:3.205 w/w | $NH_4OH$: DI $H_2O$ = 1:3.205 w/w |
| II) Gelation: High Shear | No | Yes | Yes |
| Stator configuration | | Screen | Screen |
| RPM of Rotor | | 2785 | 2680 |
| Apparent Average Shear Rate(1), × $(10)^4$ | | 1.97 | 1.9 |
| pH Range | | 5 to 9 | 7.7 to 8.5 |
| Acid Rate, gm/min | | 1947 to 2231 | 1468 to 2793 |
| Base Rate, gm/min | | 883 to 1016 | 420 to 690 |
| pH at outlet | | 8.8 | 7.7 to 8.5 |
| Gel T, C. | | 26 | 28 |
| III) Quench | No | Yes | No |
| IV) Washing | | | |
| Batch | No | No | No |
| Wash Solution | | | |
| pH of Wash Solution | | | |
| Wash Temperature, ° C. | | | |
| Conductivity of Water Wash | | | |
| (1) Initial, mmhos/$cm^2$ | | | |
| (2) Final | | | |
| Wash Temperature, ° C. | | | |
| Dilution, Wt % Solids (LOM) | | | |
| Wash Solution | $NH_4$ Acetate | $NH_4$ Acetate | $NH_4$ Acetate |
| pH of Wash Solution | | 7.3 | 7.3 |
| Conductivity of Water Wash | | | |
| (1) Initial | 11000 | 9000 | 12000 |
| (2) Final | 600 | 455 | 518 |

TABLE 6-continued

Preparation Conditions for the Silica/Alumina Bases of this Invention

| | Prior Art | This Invention | |
|---|---|---|---|
| Example No | Comparative: 23 | 24 | 25 |
| Notebook No | 1252-36B | 1934-45 | 1935-13AF |
| Wash Temperature, °C. | Ambient | Ambient | 50 |
| Acidified, pH | 5.6 | 5.6 | 5.62 |
| Wt % Solids of Concentrate | 8.6 | 5.4 | 1 to 7 |
| V) Aging | No | No | No |
| VI) Drying | Spray Drying | Spray Drying | Spray Drying |
| VII) Physical Properties (2) | | | |
| Surface Area (BET), m²/gm | 249 | 422 | 319 to 340 |
| Pore Volume (BET) cc/gm | 0.865 | 0.527 | 0.524 to 0.644 |
| MMPD, Å | 173 | 81 | 96 to 105 |
| Particle size, microns | 94 | 30 | 9 |

(1) AASR = Apparent Average Shear Rate, reciprocal seconds
(2) Measurement made after calcination for 2 hrs at 593° C., in a fixed fluidized bed reactor.

Example 26

TEM Characterization of Silica/Alumina Samples

The microstructure of the silica/alumina bases was evaluated with respect to:

(a) the presence of pockets of different densities in the matrix;

(b) the density of packing in the matrix; and (c) the presence of sheet structures.

Figure 9:
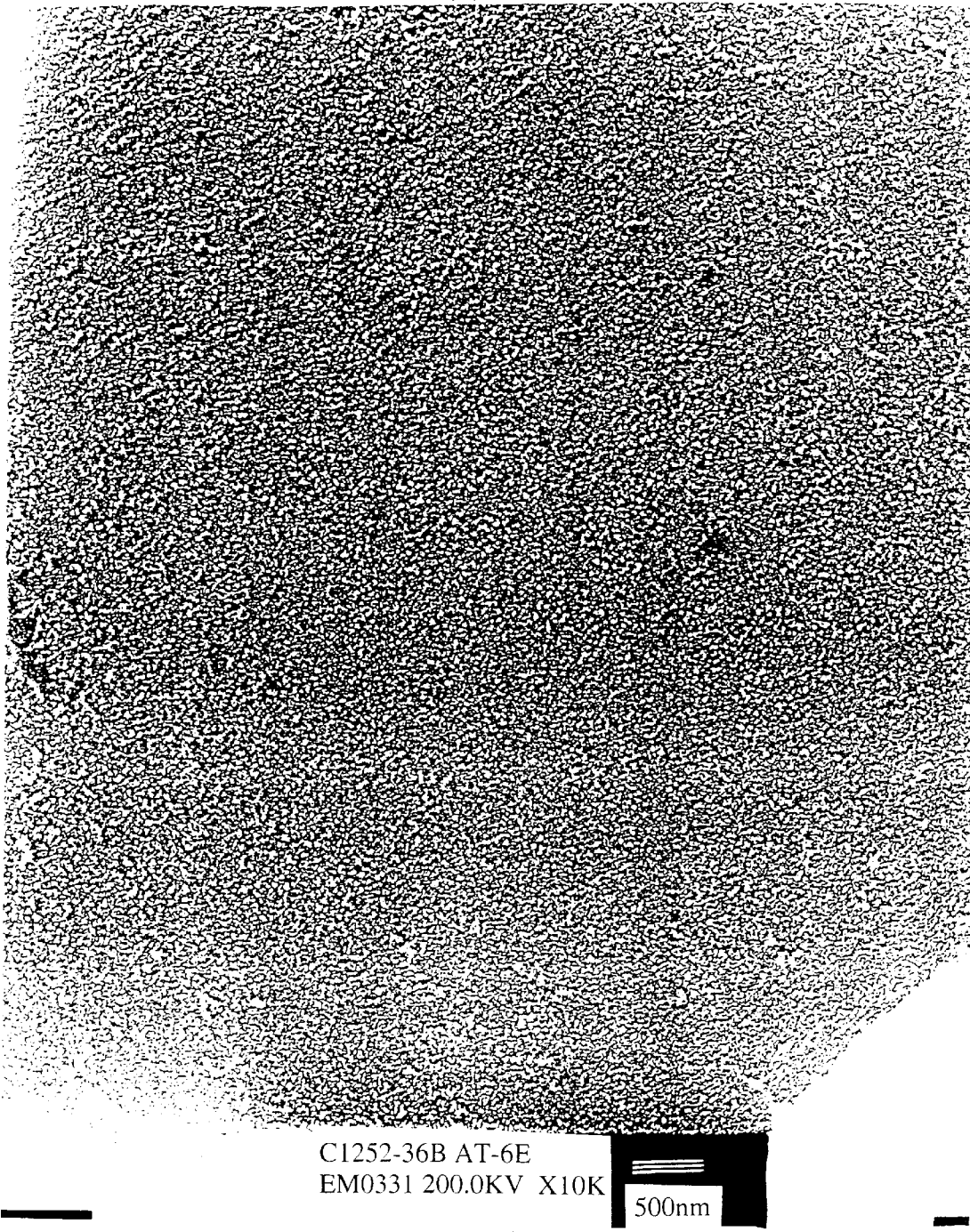
FIG. 9 is a TEM Photomicrograph of Example Sample C1252-36B (EM 0331) taken at magnification 10 KX. It shows the pore matrix without sheets.
Figure 10:
FIG. 10 is a TEM Photomicrograph of Example Sample C1934-45 (EM 2269) taken at magnification 10 KX. It shows the dense matrix with many sheets.

Specifically, the microstructures of the samples of this invention Examples 24 and 25 (for example, 1933-45 and 1934-13AF) were compared to a sample prepared without shear Example 23 (1252-36B). The typical sizes of the pores in the pockets and in the matrix were also estimated. The results are summarized in Tables 7 and 8 below. They showed that only the samples made by the CHSG method contained sheet structures. These samples also have a much denser matrix framework. This is illustrated by comparing EM 0331 (1252-36B) (FIG. 9) and EM 2269 (1934-45) (FIG. 10).

A Silica/Alumina catalyst base, Example 25 (C1935-13A) made by high shear continuous gelations was also analyzed. The material contains the unique sheet structure discussed above. The material is amorphous with no evidence of any kind of phase separation.

Tables 7 and 8 below summarize and compare the physical properties and TEM characteristics of Silica/Alumina bases of the present invention to the prior art.

TABLE 7

Comparison of the Physical Properties and the Microstructure of the Si/Al Bases of This Invention to the Prior Art

| | Prior Art | This Invention | |
|---|---|---|---|
| Example | Comparative:23 | 24 | 25 |
| Sample Id | 1252-36B | 1934-45 | 1935-13AF |
| Surface Area, m²/g (BET) | 249 | 422 | 319 |

TABLE 7-continued

Comparison of the Physical Properties and the Microstructure of the Si/Al Bases of This Invention to the Prior Art

| | Prior Art | This Invention | |
|---|---|---|---|
| Example | Comparative:23 | 24 | 25 |
| Sample Id | 1252-36B | 1934-45 | 1935-13AF |
| Pore Volume (N₂) | 0.865 | 0.527 | 0.524 |
| Mean Meso Pore Diameter | 173.4 | 81 | 90 |
| XRD | Amorphous | Amorphous | Amorphous |
| "True" Macro PV (TEM) | No | Yes | Yes |
| Microstructures (TEM) | | | |
| Particulates | No | No | No |
| Continuous network matrix | X | X | X |
| Pockets | X | X | X |
| Sheets | No | X | X |

TABLE 8

TEM Characterization of Silica/Alumina Bases of the Prior Art and of this Invention

| | Prior Art | This Invention | |
|---|---|---|---|
| Sample ID | 1252-36B | 1934-45 | 1935-13A Fines |
| Example | Comparative: 23 | 24 | 25 |
| Amorphous | Yes | Yes | Yes |
| Particulates | No | No | No |
| Size of Particulates | | | |
| Size of Pores | | | |
| Continuos network matrix | X | X | X |
| Density of Matrix | — | — | — |
| Size of Matrix Pores, nm | 50 to 100 | 5 | 5 |
| Pockets | No | X | X |
| Density of Pockets (relative ranking) | | 5 | 5 |
| Size of Pockets, microns | | 2 to 5 | 5 |
| Porosity of Pockets (relative ranking) | | 4 | 4 |
| Size of Pocket Pores, Typical, nm | | 30 | 70 |
| Size of Pocket Pores, Range, nm | | 10 to 60 | 30 to 500 |
| Sheets | No | X | X |
| Size of sheets | | | |
| Thickness, nm | | 20 to 100 | 20 to 100 |
| Length, microns | | 1 to 3 | 1 to 3 |

While the present invention has been described with reference to specific embodiments, this application is intended to cover those various changes and substitutions that may be made by those skilled in the art without departing from the spirit and scope of the appended claims.

What is claimed is:

1. A method for preparing a silica gel composition which is a precursor material for a silica powder material with a microstructure comprising a non-particulate, dense, continuous, network matrix and encapsulated, less dense, non-particulate regions with true macropores, the method comprising:

(a) forming a first aqueous solution comprising silica ions;

(b) forming a second aqueous solution capable of neutralizing said first aqueous solution; and (c) contacting said first and second aqueous solutions in a mixer-reactor under mixing conditions at an apparent average shear rate greater that about $0.5 \times 10^4$ sec$^{-1}$ to form the silica gel composition.

2. The method according to claim 1 further comprising aging the silica gel composition in acidic or basic conditions for up to one hour.

3. The method of preparing the silica powder composition from the silica gel composition prepared by the method of claim 1, comprising the steps of:
 (a) washing the silica gel with solutions of ammonium acetate, bicarbonate or nitrate;
 (b) washing the silica gel composition in deionized water to further replace salts-contaminated water in the composition with fresh water; and
 (c) drying the washed composition to remove substantially all water.

4. The method of claim 3, further comprising calcining the dried composition for up to 8 hours at a maximum temperature of 450° C.

5. The method according to claim 1, wherein said first aqueous solution is an acidic solution comprising sodium silicate and acid wherein the second aqueous solution has a pH above 8.

6. The method according to claim 1, wherein said second aqueous solution is an ammonia based material selected from the group consisting of ammonium hydroxide; ammonium carbonate; ammonium bicarbonate and urea.

7. The method according to claim 1, wherein said first aqueous solution is a basic solution of sodium silicate and wherein the second aqueous solution has a pH below 6.

8. The method according to claim 1, wherein said second aqueous solution is sulfuric acid.

9. The method according to claim 1, wherein said neutralization step is conducted in such a manner that the pH of the combined first aqueous solution and the neutralizing medium is controlled in the range of about 3.5 to about 11.

10. The method of claim 1, wherein said catalyst is activated by being heated to a temperature in the range of 300° C. to 900° C. for from 2 to 16 hours.

11. The method of claim 5 further comprising the steps of:
 (a) preparing an aqueous slurry of amorphous silica gel by continuously feeding an acidic solution comprising sodium silicate and acid to an emulsifier mixer while simultaneously and continuously feeding to said mixer an alkaline solution;
 (b) operating said mixer at an apparent average shear rate greater the about $0.5\times10^4$ sec$^{-1}$ so that the precipitated silicate has sheets of silica in its microstructure;
 (c) recovering said silica from said aqueous slurry using a vibrating filtration membrane to a solids content from 8 to 20 wt. %, after washing;
 (d) drying the silica from (c);
 (e) calcining the silica from (d);
 (f) dispensing a chromium compound substantially uniformly onto said silica from (d) or (e) to form a catalyst having from 0.01 to 4 wt. % chromium;
 (g) drying said catalyst; and
 (h) activating said dry catalyst from (f) by heating to a temperature from 300° C. to 900° C. for from 2 to 16 hours.

12. A method for preparing silica alumina powder material with a microstructure comprising a non-particulate, dense continuous network matrix, encapsulated regions with true macropores, and sheets, the method comprising:
 (a) preparing an acid aqueous solution comprising aluminum and silicon ions;
 (b) preparing a basic aqueous solution comprising ammonium hydroxide;
 (c) mixing the acidic aqueous solution and the basic aqueous solution in a mixer at an apparent average shear rate grater than about $0.5\times10^4$ sec$^{-1}$ to obtain a gel slurry with a microstructure comprising a non-particulate, dense, continuous network matrix, encapsulated regions with true macropores and sheets;
 (d) maintaining the gel slurry at approximately pH 8.0 for up to one hour before washing the gel;
 (e) washing the gel slurry first with aqueous acetate solution, then with water to obtain a gel conductivity below 1,000 mmhos;
 (f) acidifying and concentrating the gel slurry by adding acid to the gel slurry to achieve a pH below 6.0 while gradually removing water from the gel slurry; and
 (g) drying and calcining the gel slurry to form the silica-alumina powder material.

* * * * *